(12) United States Patent
Berlin et al.

(10) Patent No.: US 12,166,790 B2
(45) Date of Patent: Dec. 10, 2024

(54) METHODS AND APPARATUS FOR VISUALIZATION OF MACHINE LEARNING MALWARE DETECTION MODELS

(71) Applicant: Sophos Limited, Abingdon (GB)

(72) Inventors: Konstantin Berlin, Potomac, MD (US); Awalin Nabila Sopan, Reston, VA (US)

(73) Assignee: Sophos Limited, Abingdon (GB)

( * ) Notice: Subject to any disclaimer, the term of this patent is extended or adjusted under 35 U.S.C. 154(b) by 129 days.

(21) Appl. No.: 17/710,027

(22) Filed: Mar. 31, 2022

(65) Prior Publication Data
US 2023/0319098 A1 Oct. 5, 2023

(51) Int. Cl.
*H04L 9/40* (2022.01)
*G06N 5/022* (2023.01)

(52) U.S. Cl.
CPC .......... *H04L 63/145* (2013.01); *G06N 5/022* (2013.01); *H04L 63/1416* (2013.01)

(58) Field of Classification Search
CPC .... H04L 63/145; H04L 63/1416; G06N 5/022
USPC .......................................................... 726/24
See application file for complete search history.

(56) References Cited

U.S. PATENT DOCUMENTS

| | | | | |
|---|---|---|---|---|
| 8,682,812 B1* | 3/2014 | Ranjan | .................. | H04L 43/028 706/12 |
| 9,038,177 B1* | 5/2015 | Tierney | ............... | H04L 63/1408 709/224 |
| 9,373,080 B1* | 6/2016 | Satish | .................... | G06Q 10/04 |
| 9,769,189 B2* | 9/2017 | Mohaisen | ............. | G06F 21/566 |
| 9,805,192 B1* | 10/2017 | Gates | .................... | G06F 21/562 |
| 11,487,879 B2* | 11/2022 | Doyle | ........................ | G06F 8/77 |
| 11,496,501 B1* | 11/2022 | Liu | .......................... | G06N 5/04 |
| 11,637,858 B2* | 4/2023 | Wojnowicz | .......... | H04L 63/145 726/23 |

(Continued)

OTHER PUBLICATIONS

[Author Unknown] "How it works". Virus Total, Jun. 13, 2021, [Online] Retrieved from the Internet, https://web.archive.org/web/20210613054218/https://support.virustotal.com/hc/en-us/articles/115002126889-How-it-works, 2 pages.

(Continued)

*Primary Examiner* — Thanh T Le
(74) *Attorney, Agent, or Firm* — COOLEY LLP

(57) ABSTRACT

Embodiments disclosed include methods and apparatus for visualization of data and models (e.g., machine learning models) used to monitor and/or detect malware to ensure data integrity and/or to prevent or detect potential attacks. Embodiments disclosed include receiving information associated with artifacts scored by one or more sources of classification (e.g., models, databases, repositories). The method includes receiving inputs indicating threshold values or criteria associated with a classification of maliciousness of an artifact and for selecting sample artifacts. The method further includes classifying and selecting the artifacts, based on the criteria, to define a sample set, and based on the sample set, generating a ground truth indication of classification of maliciousness for each sample artifact in the sample set. The method further includes using the ground truth indications to evaluate and display, via an interface, a representation of a performance of sources of classification and/or quality of data.

21 Claims, 18 Drawing Sheets

(56) References Cited

U.S. PATENT DOCUMENTS

| | | | | |
|---|---|---|---|---|
| 2011/0145920 | A1* | 6/2011 | Mahaffey | H04W 12/12 |
| | | | | 726/22 |
| 2015/0128263 | A1* | 5/2015 | Raugas | G06F 21/552 |
| | | | | 726/23 |
| 2017/0171236 | A1* | 6/2017 | Ouchn | H04L 63/1433 |
| 2019/0260779 | A1* | 8/2019 | Bazalgette | H04L 63/14 |
| 2020/0134545 | A1* | 4/2020 | Appel | G06Q 10/04 |
| 2022/0036208 | A1* | 2/2022 | Rao | H04L 63/145 |
| 2022/0229906 | A1* | 7/2022 | Bálek | G06N 20/00 |
| 2022/0385673 | A1* | 12/2022 | Dong | G06N 20/00 |
| 2023/0004888 | A1* | 1/2023 | Li | G06N 5/048 |
| 2023/0007042 | A1* | 1/2023 | Haworth | H04L 63/205 |
| 2023/0205884 | A1* | 6/2023 | Nabeel | G06F 21/566 |
| | | | | 726/23 |
| 2023/0216865 | A1* | 7/2023 | Bhatia | H04L 63/1425 |
| | | | | 726/23 |

OTHER PUBLICATIONS

Sopan and Berlin, "AI Total: Analyzing Security ML Models with Imperfect Data in Production," Oct. 13, 2021, [Online] Retrieved from the Internet, https://arxiv.org/abs/2110.07028, 5 pages.

Zhu, Shuofei et al., "Measuring and Modeling the Label Dynamics of Online Anti-Malware Engines", Proceedings of the 29th USENIX Security Symposium, Aug. 12-14, 2020, 978-1-939133-17-5, pp. 2361-2378, https://www.usenix.org/system/files/sec20-zhu.pdf, 19 pages.

Amershi, Saleema et al., "Software Engineering for Machine Learning: A Case Study." 2019 IEEE/ACM 41st International Conference on Software Engineering: Software Engineering in Practice (ICSE-SEIP), 2019, pp. 291-300.

Amershi, Saleema et al., "ModelTracker: Redesigning Performance Analysis Tools for Machine Learning", Proceedings of the 33rd Annual ACM Conference on Human Factors in Computing Systems, 2015, pp. 337-346.

Anderson, Hyrum et al., "DeepDGA: Adversarially-Tuned Domain Generation and Detection." Proceedings of the 2016 ACM Workshop on Artificial Intelligence and Security, 2016, pp. 13-21.

Angelini, Marco et al., "The Goods, the Bads and the Uglies: Supporting Decisions in Malware Detection through Visual Analytics", 2017 IEEE Symposium on Visualization for Cyber Security (VizSec), 2017, pp. 1-8.

[Author Unknown], "Customized Monitoring For Your ML Models", aporia, Nov. 26, 2021, [Online] Retrieved from the Internet, https://web.archive.org/web/20211126093101/https://www.aporia.com/, 6 pages.

Blowers and Williams, "Machine Learning Applied to Cyber Operations", Network Science and Cybersecurity, 2014, pp. 155-175, Springer, 282 pages.

Bosch, Jan et al., "Engineering AI systems: A Research Agenda", In Artificial intelligence Paradigms for Smart Cyber-Physical Systems, IGI Global, 2021, pp. 1-19.

Breck, Eric et al., "The ML Test Score: A Rubric for ML Production Readiness and Technical Debt Reduction", 2017 IEEE International Conference on Big Data, IEEE, 2017, pp. 1123-1132.

Breck, Eric et al., "Data Validation For Machine Learning", MLSys, 2019, 14 pages.

Chatzimparmpas, Angelos et al., "Visual Analytics for Feature Engineering Using Stepwise Selection and Semi-Automatic Extraction Approaches", arXiv preprint arXiv:2103.14539, 2021, 18 pages.

Cordeiro and Carneiro. "A Survey on Deep Learning with Noisy Labels: How to train your model when you cannot trust on the annotations?", 2020 33rd SIBGRAPI Conference on Graphics, Patterns and Images (SIBGRAPI), IEEE, 2020, pp. 9-16.

De Lorenzo, Andrea et al., "Visualizing the outcome of dynamic analysis of Android malware with VizMal", Journal of Information Security and Applications, 2020, 50: 102423, doi: 10.1016/j.jisa.2019.102423, 9 pages.

Hermann and Del Balso, "Meet Michelangelo: Uber's Machine Learning Platform", Uber Engineering, Sep. 5, 2017, [Online] Mar. 2, 2020, 17 pages.

Kahng, Minsuk et al., "ACTIVIS: Visual Exploration of Industry-Scale Deep Neural Network Models", IEEE Transactions on Visualization and Computer Graphics, 2017, 24(1), pp. 88-97.

Kyadige, Adarsh et al., "Learning from Context: A Multi-View Deep Learning Architecture for Malware Detection", 2020 Symposium on Security and Privacy Workshops (SPW), IEEE, 2020, pp. 1-7.

Ledoux and Lakhotia, "Malware and Machine Learning", Intelligent Methods for Cyber Warfare, Springer, 2015, pp. 1-42.

Sambasivan, Nithya et al., ""Everyone wants to do the model work, not the data work": Data Cascades in High-Stakes AI", Proceedings of the 2021 CHI Conference on Human Factors in Computing Systems, May 8-13, 2021, pp. 1-15.

Saxe and Berlin, "Deep Neural Network Based Malware Detection Using Two Dimensional Binary Program Features", 2015 10th International Conference on Malicious and Unwanted Software (MALWARE), IEEE, 2015, pp. 11-20.

Shneiderman, Ben, "The Eyes Have It: A Task By Data Type Taxonomy for Information Visualizations", Proceedings 1996 IEEE Symposium on Visual Languages, 1996, pp. 336-343, doi: 10.1109NL.1996.545307.

Sopan, Awalin et al., "Building a Machine Learning Model for the SOC, by the Input from the SOC, and Analyzing it for the SOC", 2018 IEEE Symposium on Visualization for Cyber Security (VizSec), IEEE, 2018, pp. 1-8.

Wagner, M. et al., "A Survey of Visualization Systems for Malware Analysis", Eurographics Conference on Visualization (EuroVis), 2015, pp. 105-125.

Wongsuphasawat, Kanit et al., "Visualizing Dataflow Graphs of Deep Learning Models in TensorFlow", IEEE Transactions on Visualization and Computer Graphics, 2017, 24(1), pp. 1-12.

* cited by examiner

FIG. 3A

FIG. 3B
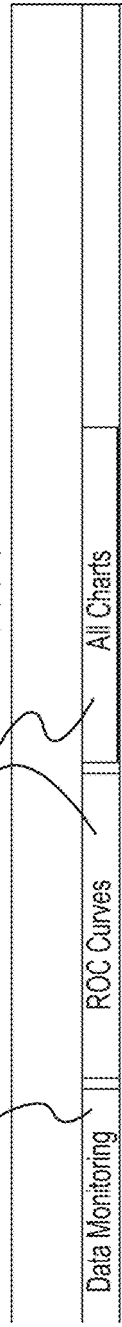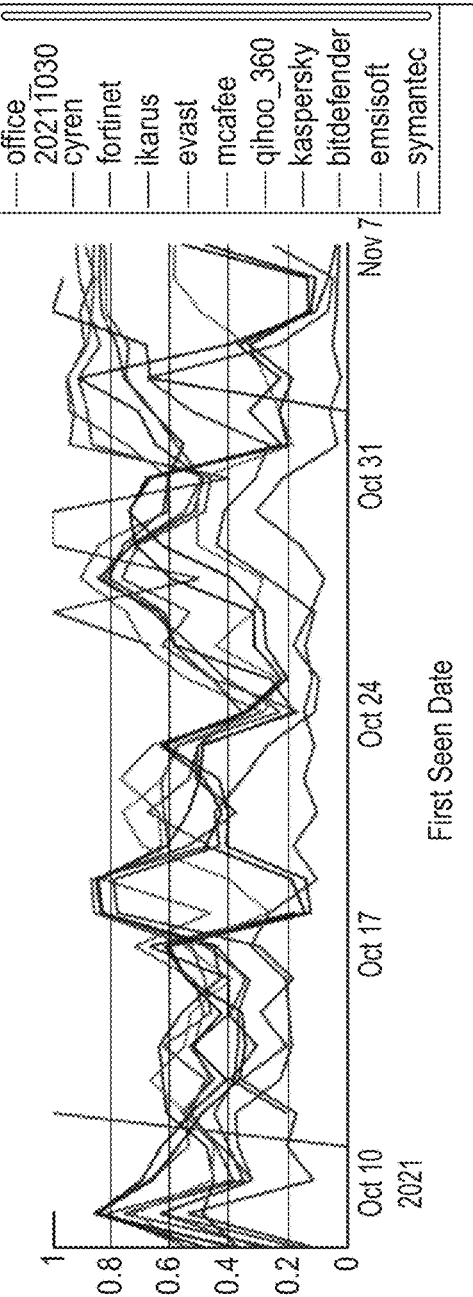

350 ↘

| Start Date | End Date |
|---|---|
| 📅 11/01/2021 | 📅 11/30/2021 |

Model Type
Office ▼

Data Source
VirusTotal ▼

Weight Files By
Uniform ▼

Benignware Definition
DS Official Benign ▼

Malware Definition
DS Official Malware ▼

Models to Evaluate
[ office_20211030 × ] | × | ∨

Combination of Models to Evaluate
[ Select Combination of Models and Guardrails  0 ] | ∨

Vendors to Compare
[ Avast × ] [ Bitdefender × ]
[ Cyren × ] [ Emsisoft × ]
[ Fortinet × ] [ Ikarus × ]   | × | ∨
[ Kaspersky × ] [ Mcafee × ]
[ Qihoo 360 × ] [ Sophos × ]
[ Symantec × ]

358 — ☰ Advanced Filters ∧

372 — Select Only Data Samples Scored by All ML Models ☐

374 — Model Threshold
(26)
——————●———————
0    25    50    75    100

376 — Select Only Data Samples Observed by At Least X% of the Engines
(50)
————————●————————
0%      50%      100%

378 — Select File Types
[ Select File Types ] | ∨

FIG. 5

Vendors to Compare

Avast x | Bitdefender x
Cyren x | Emsisoft x
Fortinet x | Ikarus x
Kaspersky x | Mcafee x

FIG. 7B

| Interface | DASHBOARD | NEXTGENWEB | | | | | |
|---|---|---|---|---|---|---|---|
| Filters | | MODEL METRICS | PREDICTION BREAKDOWNS | | | | |

Start Date: 10/08/2021  End Date: 11/07/2021  (APPLY)

Model Type: Office ▼

Data Source: VirusTotal ▼

Weight Files By: Uniform ▼

Benignware Definition: DS Official Benign ▼

Malware Definition: DS Official Malware ▼

Models to Evaluate: office_20211030 x

— 384
— 384D

| | Breakdown by Family | Malicious Data by File Type | Benign Data by Filename | | | | |
|---|---|---|---|---|---|---|---|
| | | Detection per File Type | | | | Model Used for Detection office_20211030 | Model Score |
| File Type | Detection Ratio | Detected | Missed | ↓Total | Unscanned | Unscanned Ratio | Endpoints |
| Microsoft Excel-OLE | 0.40 | 5742 | 94 | 14523 | 8687 | 0.60 | 9839 |
| Microsoft Excel-OPC | 0.34 | 1274 | 391 | 3732 | 2067 | 0.55 | 1484 |
| OLE | 0.12 | 209 | 68 | 1792 | 1515 | 0.85 | 688 |
| Microsoft Word-OPC | 0.10 | 131 | 93 | 1272 | 1048 | 0.82 | 502 |
| Microsoft Word-OLE | 0.09 | 82 | 31 | 898 | 785 | 0.87 | 376 |
| Microsoft Outlook mail message-OLE | 0.10 | 73 | 33 | 712 | 606 | 0.85 | 82 |
| Microsoft Encrypted Package-OLE | 0.08 | 43 | 35 | 558 | 480 | 0.86 | 968 |

| File Type | Detection Ratio | Detected | Missed | Total | Unscanned | Unscanned Ratio | Endpoints |
|---|---|---|---|---|---|---|---|
| Microsoft Excel-OLE | 0.40 | 5742 | 94 | 4523 | 8687 | 0.60 | 9839 |
| Microsoft Excel-OPC | 0.34 | 1274 | 391 | 3732 | 2067 | 0.55 | 1484 |
| Microsoft PowerPoint-OLE | 0.20 | 1 | 0 | 5 | 4 | 0.80 | 3 |
| Microsoft Installer (MSI)-OLE | 0.14 | 74 | 13 | 514 | 427 | 0.83 | 59 |
| OLE | 0.12 | 209 | 68 | 1792 | 1515 | 0.85 | 688 |
| Microsoft PowerPoint-OPC | 0.11 | 10 | 14 | 92 | 68 | 0.74 | 96 |
| Microsoft Word-OPC | 0.10 | 131 | 93 | 1272 | 1048 | 0.82 | 502 |
| Microsoft Outlook mail message-OLE | 0.10 | 73 | 33 | 712 | 606 | 0.85 | 82 |
| Microsoft Word-OLE | 0.09 | 82 | 31 | 898 | 785 | 0.87 | 376 |
| NA | 0.08 | 42 | 3 | 536 | 491 | 0.92 | 137 |

Interface  DASHBOARD | NEXTGENWEB

Filters (APPLY)

Start Date 10/08/2021  End Date 11/07/2021

Model Type: Office

Data Source: VirusTotal
Weight Files By: Uniform
Benignware Definition: DS Official Benign
Malware Definition: DS Official Malware
Models to Evaluate: office_20211030
Combination of Models to Evaluate: Select Combination of Models and Guardrails

MODEL METRICS | PREDICTION BREAKDOWNS

Breakdown by Family | Malicious Data by File Type | Benign Data by Filename

Model Used for Detection: office_20211030  Model Score

385 — Detection per File Type
384D

| Vendors to Compare |
| --- |
| Avast x, Bitdefender x |
| Cyren x, Emsisoft x |
| Fortinet x, Ikarus x |
| Kaspersky x, Mcafee x |
| Qihoo x, Sophos x |

| File Type | 0.08 | 43 | 35 | 588 | 480 | 0.86 | 968 |
| --- | --- | --- | --- | --- | --- | --- | --- |
| Microsoft Encrypted Package-OLE | | | | | | | |
| Microsoft Visio-OLE | 0 | 0 | 1 | 2 | 1 | 0.50 | 1 |
| Microsoft Office XML Containing Macros... | NA | | | 2 | 2 | 1 | 2 |
| Microsoft Publisher-OLE | NA | | | 1 | 1 | 1 | |

FIG. 9B

METHODS AND APPARATUS FOR VISUALIZATION OF MACHINE LEARNING MALWARE DETECTION MODELS

BACKGROUND

The embodiments described herein relate to methods and apparatus for visualization of models (e.g., machine learning models) used to monitor software for virus and/or malware detection to ensure data integrity and/or to prevent or detect potential attacks.

Some known malicious artifacts can be embedded and distributed in several forms (e.g., text files, audio files, video files, data files, executable files, uniform resource locators (URLs) providing the address of a resource on the Internet, etc.) that are seemingly harmless in appearance but hard to detect and can be prone to cause severe damage or compromise of sensitive hardware, data, information, and/or the like. Several sources (e.g., malware detection models) attempt to scan artifacts and classify them by identifying their maliciousness. Various sources of classification, however, may use various different methods of evaluation and classification and their performance is not easily visualized. Thus, there exists a need for assimilation and integration of various sources of classification in a rigorous and unbiased manner.

SUMMARY

According to an aspect of the present disclosure, an apparatus including a memory and a processor is configured to generate labels associated with a maliciousness of potentially malicious artifacts and to evaluate a performance of one or more sources of classification using the labels associated with a maliciousness of potentially malicious artifacts. The apparatus includes one or more memories; and one or more processors. The one or more processors are in communication with the one or more memories. The one or more processors are configured to receive, via an interface, data associated with multiple sources of classification of maliciousness, the data including information associated with a group of artifacts. Each artifact from the group of artifacts is associated with at least one score indicating a classification of maliciousness of that artifact based on at least one source of classification from the multiple sources of classification. The one or more processors is configured to receive a selection, via the interface, of a subset of sources of classification of maliciousness from the multiple sources of classification of maliciousness. The subset of sources of classification is used to define a dataset that is drawn from the data associated with the multiple sources of classification. The data set includes information associated with a set of artifacts from the group of artifacts such that each artifact from the set of artifacts has at least one score indicating a classification of maliciousness based on at least one source of classification from the subset of sources of classification of maliciousness. The one or more processors is further configured to determine a label indicating a classification of maliciousness for each artifact from the set of artifacts based on indications of maliciousness for that artifact from a predefined number of sources of classification from the subset of sources of classification. The one or more processors is further configured to identify comparisons between the label for each artifact from the set of artifacts and the at least one score related to a classification of maliciousness or that artifact based on at least one evaluated source of classification of maliciousness. The one or more processors is further configured to determine, based on the comparisons, a set of aggregate measures of performance of the at least one evaluated source of classification of maliciousness. The one or more processors is further configured to receive, via the interface, a request for information associated with a performance of the at least one evaluated source of classification of maliciousness. The one or more processors is further configured to display, via the interface, a graphical representation of at least one aggregate measure from the set of aggregate measures of performance of the at least one evaluated source of classification of maliciousness.

According to an aspect of the present disclosure, a method includes receiving information associated with a group of artifacts. Each artifact from the group of artifacts is associated with at least one score associated with a classification of maliciousness of that artifact based on a source of classification from multiple sources of classification. The method includes receiving a first criterion for classifying each artifact from the group of artifacts. The first criterion indicates a threshold score associated with a classification of maliciousness of that artifact. The method further includes receiving a second criterion for selecting sample artifacts from the group of artifacts. The second criterion indicates a minimum number of scores associated with a sample artifact. Each score from the minimum number of scores is associated with a classification of maliciousness of that sample artifact based on a source of classification from the multiple sources of classification. The method further includes classifying the group of artifacts based on the first criterion, and selecting, based on the second criterion, sample artifacts from the group of artifacts to define a sample set. The method further includes determining, based on the selecting, a ground truth indication of classification of maliciousness for each sample artifact in the sample set. The method further includes displaying, via an interface, based on the ground truth indication of classification of maliciousness for one or more sample artifacts in the sample set, a representation of a performance of a source of classification.

According to an aspect of the present disclosure, a computer program product storing code representing instructions to be executed by one or more processors includes instructions including code to cause the one or more processors to receive first data associated with multiple machine learning (ML) models. Each ML model from the multiple ML models is associated with curated data on potentially malicious content. The first data is associated with a first group of files. Each file from the first group of files is associated with at least one score of a classification of maliciousness of that file based on an output from at least one ML model from the multiple ML models. The computer program product includes instructions including code to cause the one or more processors to receive second data associated with an identified ML model. The second data is associated with a second group of files. Each file from the second group of files is associated with a score of a classification of maliciousness of that file based on an output from the identified ML model. The computer program product further includes instructions including code to cause the one or more processors to receive telemetry information associated with the first data and the second data, and identify a subset of files from the first group of files such that each file from the subset of files is matched, based on the telemetry information, with a corresponding file from the second group of files. The computer program product further includes instructions including code to cause the one or more processors to define ground truth information associated with a classification of maliciousness for each file from the subset of files. The ground truth information is based on the at least one score of a classification of maliciousness of each file from the subset of files based on an output from at least one ML model from the multiple ML models. The computer program product further includes instructions including code to cause the one or more processors to assign, based on the ground truth information, a label to a set of files from the second group of files. Each file from the set of files is matched with a corresponding file from the subset of files. The computer program product further includes instructions including code to cause the one or more processors to display a graphical representation of labels associated with the one or more files from the second group of files.

BRIEF DESCRIPTION OF THE DRAWINGS

Figure 3A:
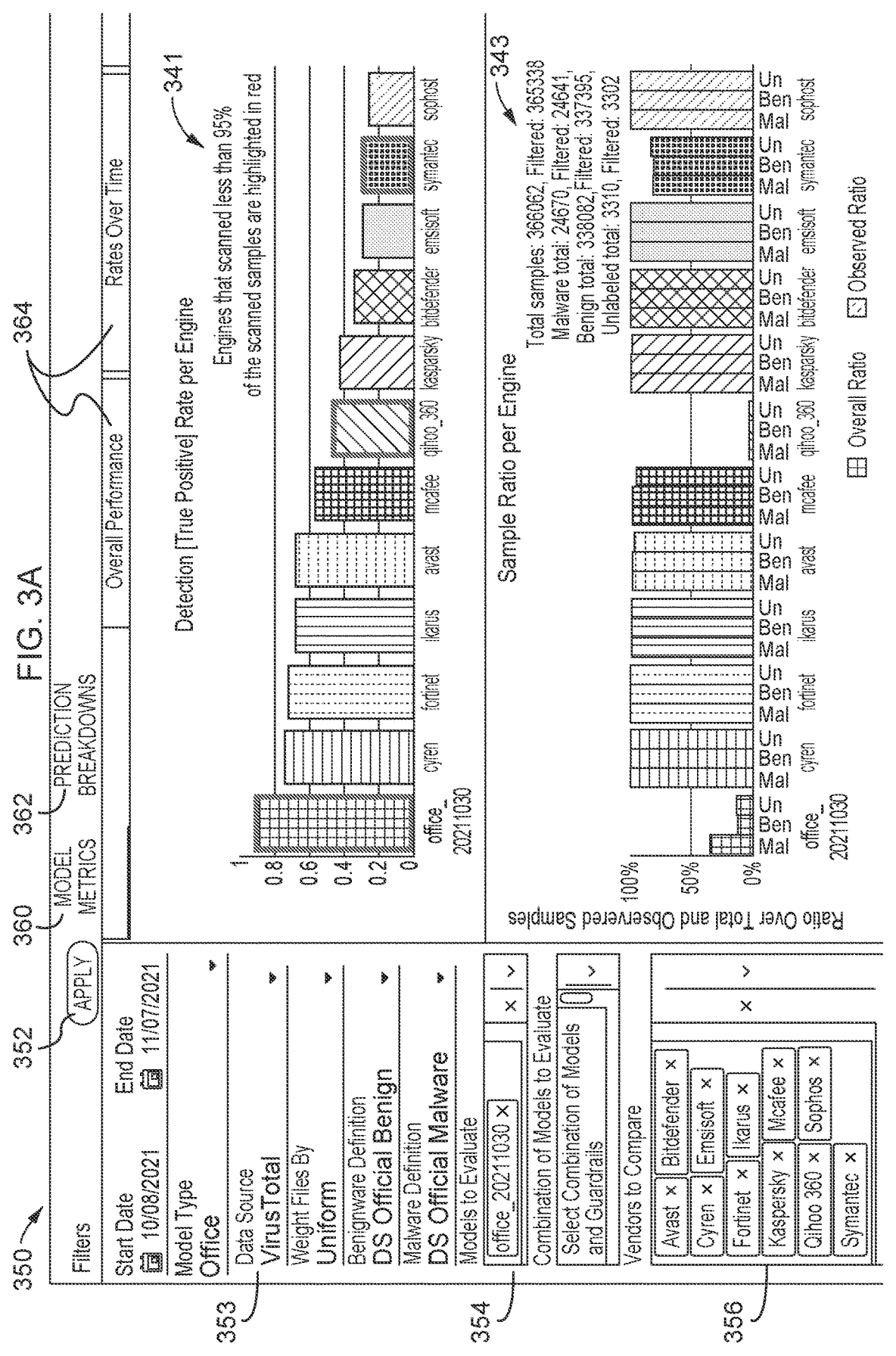

FIGS. 3A-3D show an interface implemented by an analysis device for visualizing an evaluation of malware classification sources and data associated with the classification sources, according to an embodiment.

FIG. 5 illustrates an interface showing an example implementation of data handling to evaluate malware classification sources and data associated with the malware classification sources, according to an embodiment.

FIGS. 7A-7B illustrate an interface showing an example visualization of performance of malware classification sources and data associated with the malware classification sources, according to an embodiment.

FIG. 8 illustrates an interface showing an example visualization of performance of malware classification sources and data associated with the malware classification sources, according to an embodiment.

FIGS. 9A-9B. illustrate an interface showing an example visualization of performance of malware classification sources and data associated with the malware classification sources, according to an embodiment.

DETAILED DESCRIPTION

Figure 1:
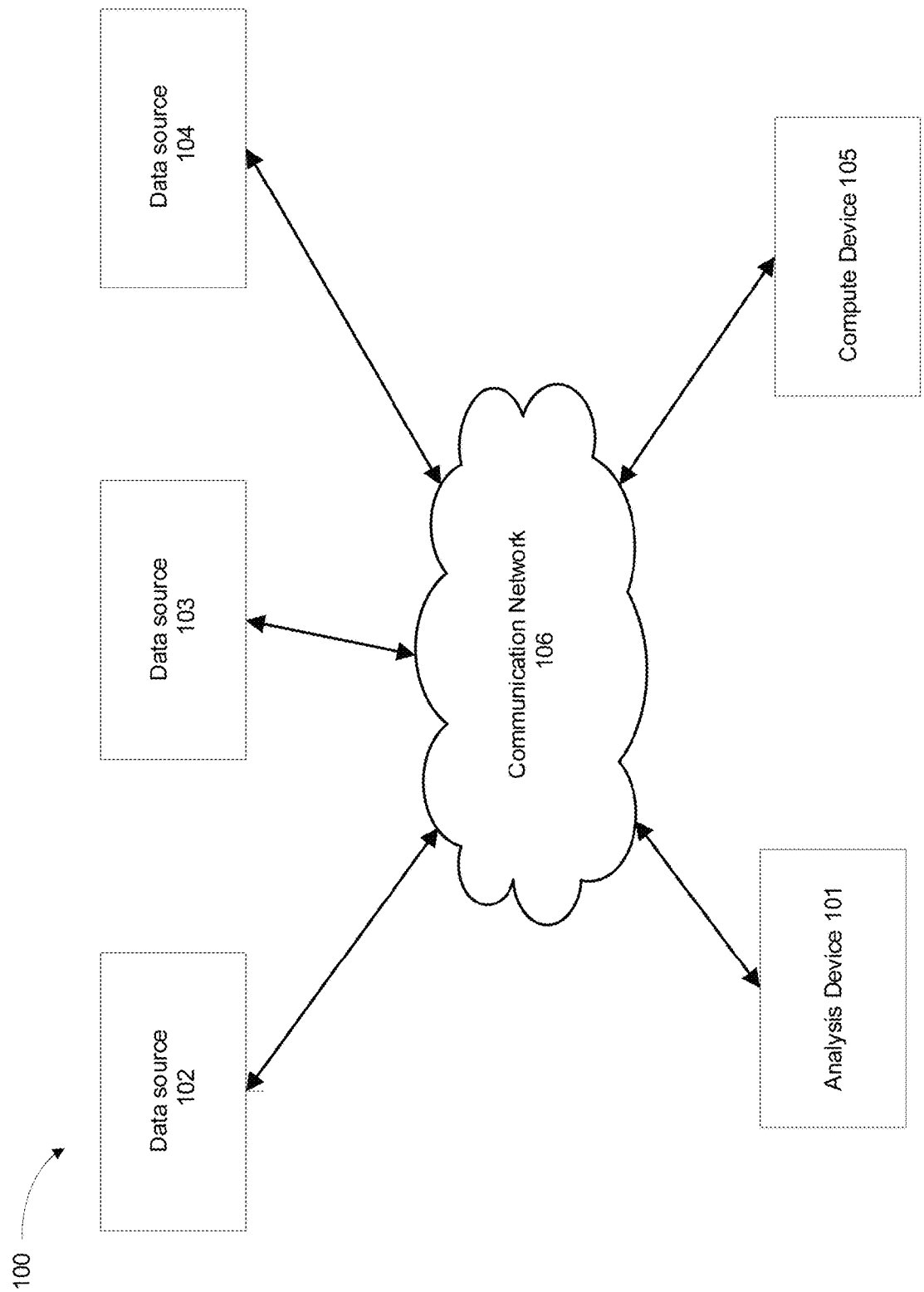
FIG. 1 is a schematic block diagram of an analysis system for evaluating malware classification sources and their performance at classifying potentially malicious artifacts, according to an embodiment.

In some embodiments, an apparatus includes a memory and a processor operatively coupled to the memory. The processor is configured to receive, via an interface, data associated with multiple sources of classification of maliciousness. The data includes information associated with a group of artifacts. Each artifact from the group of artifacts is associated with at least one score indicating a classification of maliciousness of that artifact based on at least one source of classification from the multiple sources of classification. The processor is configured to receive a selection, via the interface, of a subset of sources of classification of maliciousness from the multiple sources of classification of maliciousness. The subset of sources of classification is used to define a dataset that is drawn from the data associated with the multiple sources of classification. The data set includes information associated with a set of artifacts from the group of artifacts such that each artifact from the set of artifacts has at least one score indicating a classification of maliciousness based on at least one source of classification from the subset of sources of classification of maliciousness. The processor is further configured to determine a label indicating a classification of maliciousness for each artifact from the set of artifacts based on indications of maliciousness for that artifact from a predefined number of sources of classification from the subset of sources of classification. The processor is further configured to identify comparisons between the label for each artifact from the set of artifacts and the at least one score related to a classification of maliciousness or that artifact based on at least one evaluated source of classification of maliciousness. The processor is further configured to determine, based on the comparisons, a set of aggregate measures of performance of the at least one evaluated source of classification of maliciousness. The processor is further configured to receive, via the interface, a request for information associated with a performance of the at least one evaluated source of classification of maliciousness. The processor is further configured to display, via the interface, a graphical representation of at least one aggregate measure from the set of aggregate measures of performance of the at least one evaluated source of classification of maliciousness.

In some embodiments, a non-transitory processor-readable medium stores code representing instructions to be executed by a processor. The instructions include code to cause the processor to receive first data associated with multiple machine learning (ML) models. Each ML model from the multiple ML models is associated with curated data on potentially malicious content. The first data is associated with a first group of files. Each file from the first group of files is associated with at least one score of a classification of maliciousness of that file based on an output from at least one ML model from the multiple ML models. The instructions include code to cause the processor to receive second data associated with an identified ML model. The second data is associated with a second group of files. Each file from the second group of files is associated with a score of a classification of maliciousness of that file based on an output from the identified ML model. The instructions further include code to cause the processor to receive telemetry information associated with the first data and the second data, and to identify a subset of files from the first group of files such that each file from the subset of files is matched, based on the telemetry information, with a corresponding file from the second group of files. The instructions further include code to cause the processor to define ground truth information associated with a classification of maliciousness for each file from the subset of files. The ground truth information is based on the at least one score of a classification of maliciousness of each file from the subset of files based on an output from at least one ML model from the group of ML models. The instructions further include code to cause the processor to assign, based on the ground truth information, a label to a set of files from the second group of files. Each file from the set of files is matched with a corresponding file from the subset of files. The instructions further include code to cause the processor to display a graphical representation of labels associated with the one or more files from the second group of files.

In some embodiments, a method can include receiving information associated with a group of artifacts. Each artifact from the group of artifacts is associated with at least one score associated with a classification of maliciousness of that artifact based on a source of classification from multiple sources of classification. The method can include receiving a first criterion for classifying each artifact from the group of artifacts. The first criterion indicates a threshold score associated with a classification of maliciousness of that artifact. The method can further include receiving a second criterion for selecting sample artifacts from the group of artifacts. The second criterion indicates a minimum number of scores associated with a sample artifact. Each score from the minimum number of scores being associated with a classification of maliciousness of that sample artifact based on a source of classification from the multiple sources of classification. The method can further include classifying the group of artifacts based on the first criterion, and selecting, based on the second criterion, sample artifacts from the group of artifacts to define a sample set. The method can further include determining, based on the selecting, a ground truth indication of classification of maliciousness for each sample artifact in the sample set. The method can further include displaying, via an interface, based on the ground truth indication of classification of maliciousness for one or more sample artifacts in the sample set, a representation of a performance of a source of classification.

Malicious software, otherwise referred to as malware, can be intrusive software designed to damage, destroy, or cause harm to computers, computer systems, users, or other entities associated with the computer systems. Malware can be distributed via artifacts including computer files ("computer file(s)" or "file(s)") such as text or document files (collectively, "document file(s)") of various filetypes, communicated via internet communications serving as a common delivery mechanism for malware. For example, document files can include embedded, executable scripts or macros that, in some cases, can be configured to cause malicious activity on a host device (e.g., a computer) or in a host environment (e.g., of a computer, virtual machine, etc.). Malware can also be associated with a variety of artifacts including uniform resource locators (URLs), Internet Protocol addresses (IPs), computer processes, registry entries, and the like, which may be used, generated, or modified to mediate malware distribution and/or execution. Examples of common malware include viruses, worms, Trojan viruses, spyware, adware, and ransomware.

As used herein, an artifact can be or include, for example, any dataset(s), filepath(s), Uniform Resource Locator (URL), file(s), device(s), device behavior, user behavior, network behavior, network identifier, and/or entity represented and/or associated with computer-related resources. For example, an artifact can include a function of software code, a webpage(s), a data file(s), a model file(s), a source file(s), a script(s), a process, a binary executable file(s), a table(s) in a database system, a development deliverable(s), an active content(s), a word-processing document(s), an e-mail message(s), a text message, a network address, a device or entity (e.g., a network-connected compute device and/or computer system, a server, a smartphone, a tablet a laptop, a multimedia device, etc.), a network address (e.g., a Media Control (MAC) address, Internet Protocol (IP) address, etc.) of a compute device, and/or the like.

Multiple entities direct their efforts to analyze various potentially malicious artifacts and classify the artifacts, based on their analysis, as malicious or benign. Several such entities make the data associated with their analysis and classification available for other entities, thus serving as sources of classification of the potentially malicious artifacts. For example, entities can include organizations that implement classifier engines that can be supervised or unsupervised classifiers, vendors (e.g., anti-malware vendors) operating maliciousness detection and classification engines, entities that employ human classifiers, entities that implement signature-based classification of potentially malicious artifacts implemented by artificial intelligence or by human operators, hybrid classification engines with computer based classification curated by human supervision, individual end users reporting potentially malicious artifacts, and/or the like. In some instances, such entities serve as sources of classification of the potentially malicious artifacts by providing annotated data associated with each potentially malicious artifact that they have scanned and classified or labeled as malicious or benign. In some instances, the annotations can include a score associated with each potentially malicious artifact that is analyzed, where the score indicates a degree of maliciousness on a predetermined scale. In some instances, the sources of classification can submit their annotations associated with each potentially malicious artifact that is analyzed to a data aggregator that maintains a collective source of classification. For example, "VirusTotal" is a service that aggregates data provided by vendors of antivirus products or online scan engines, or individual users. the provided data includes annotated identification or classification of one or more potentially malicious artifact and properties associated with the artifact (e.g., telemetry information). The entities providing data, referred to as contributors, can also receive information associated with artifacts (e.g., copies of artifacts) that were flagged by the scans of other contributors but passed by their own scan engine, to help improve their engine and improve the annotated data on the aggregator.

While aggregators can include data associated with classification of potentially malicious artifacts by several sources of classification, the different sources of classification (e.g., security engines of several vendors) annotating one particular artifact or class of artifacts can often disagree with each other on whether a given artifact is malicious or not, or to what degree it is malicious or benign. There exists a need for a user or requestor of information to aggregate the various classifications provided by each source of classification to generate and assign a single label to the potentially malicious artifact. Moreover, there is a need for the process or strategy employed to aggregate the various classifications and/or annotations provided by each source of classification to be unbiased. There is a need for the process of aggregation of the various classifications and the data provided by the sources of classification to be scrutinized via multiple methods of parsing the data and generating metrics that measure performance to evaluate performance of the sources of classification as well as to evaluate a quality of data that is being aggregated. The process of aggregation of the various classifications to generate a label for each potentially malicious artifact may also be amenable to implementing updates to the label upon gathering new information associated with the artifact and/or the one or more sources of classification providing the classifications and/or annotations for that artifact.

FIG. 1 is a schematic representation, as a block diagram, of an analysis system 100 for evaluating the performance and/or the data quality associated with the output of one or more sources of classification of potentially malicious artifacts, according to one embodiment.

The analysis system 100, also referred to herein as "a system" is configured to analyze and evaluate data associated with the classification of a set of potentially malicious artifacts by a set of sources of classification of maliciousness. The analysis system 100 includes an analysis device 101, data sources 102-104, and a compute device 105, each connected to the other via a communication network 106, as illustrated in FIG. 1. While the system 100 is illustrated to include three data sources 102-104, and one compute device 105, a similar analysis system can include any number of data sources and/or any number of compute devices.

The analysis device 101 of the analysis system 100 can be configured to receive data from data sources 102-104 via the communication network 106. The analysis device 101 can receive, from the data sources 102-104, data associated with classification of potentially malicious artifacts by a variety of sources of classification. The analysis device 101 can be configured to analyze the data to evaluate the performance of the sources of classification and/or the quality of the classification of data. In some implementations, the performance of the sources of classification can include quantifying how accurately the source of classification identified or classified artifacts as malicious or benign. In some implementations, the performance of the sources of classification can include quantifying how accurately the source of classification provided a score indicating a degree of maliciousness. Performance of sources of classification can be measured using suitable metrics including, for example, precision, recall, sensitivity, specificity, and/or the like, as described in further detail herein. In some implementations, the data received from the sources of classification can include indications of classifications from each source for each artifact or class of artifacts, a robustness or confidence associated with the classifications from each source based on a degree of match between classifications from that source and classifications from other sources, and/or the like.

The data sources 102-104 can be any suitable source of data providing classification of artifacts that can be potentially malicious in nature. For example, the data sources 102-104 can include repositories or aggregators of data (e.g., VirusTotal, databases of annotated data including labeled or scored artifacts that are potentially malicious, etc.) associated with potentially malicious artifacts. Each artifact from the potentially malicious artifacts whose data is housed in the repositories or aggregators can be associated with annotations based on classification of maliciousness (e.g., a maliciousness score) of that artifact by one or more sources of classification (e.g., vendors of anti-virus scanners, entities running and maintaining human and/or computer-based classifiers of potentially malicious artifacts, individual users, etc.). As an example, an aggregator can implement multiple antivirus scanners itself, and receive data from multiple vendors, entities, and/or users serving as contributors and providing annotations for each scanned artifact. Such annotations can include a score indicating a degree or classification of maliciousness of the artifact.

The compute device 105 can be any suitable hardware-based computing device and/or a multimedia device, such as, for example, a server, a desktop compute device, a smartphone, a tablet, a wearable device, a laptop and/or the like. The compute device 105 can be a user device configured to connect to the analysis device 101 and/or the data sources 102-104, as desired by a user. For example, the compute device 105 can be used to present, visualize and/or display the analysis performed by the analysis device 101, as discussed in further detail herein. In some implementations, the compute device 105 can be configured to implement the interface described herein, for example the interface 350. The compute device 105 can interact with the analysis device 101 to receive and/or send signals/communications from and/or to the analysis device 101 to exchange data with the analysis device 101.

In some embodiments, the analysis device 101, also referred to herein as "the device", can be used to implement processes or components configured to collect the data from the data sources 102-104, organize and/or normalize the data according to a predetermined organizational structure, analyze the data, and evaluate the data and/or the source of the data to generate a visualization of the performance of one or more sources of classification and/or a visualization of the quality of data. In some embodiments, the analysis device 101 and/or the compute device 105 can implement an interface (e.g., a user interface) configured to provide one or more tools to receive instructions (e.g., from a user) and to instruct the analysis device 101 to organize, and/or analyze the data based on the instructions. The analysis device 101 can also be configured to receive instructions (e.g., from the compute device 105 via communication network 106), and based on the instructions, generate an integrated single label for each artifact in a sample set of artifacts. The label can indicate a degree or classification of maliciousness associated with the artifact from the sample set of the data. The analysis device 101 can then evaluate the performance of one or more sources of classification by generating ground truth data based on the labels associated with the sample set. The analysis device 101 can be configured to receive instructions via the interface (e.g., at the analysis device 101 or from the compute device 105 via communication network 106) to measure the performance of the one or more sources of classification by calculating metrics of performance, and in response to the instructions, output the performance of the one or more sources of classification by displaying one or more of the metrics of performance, as described in further detail herein.

Figure 2:
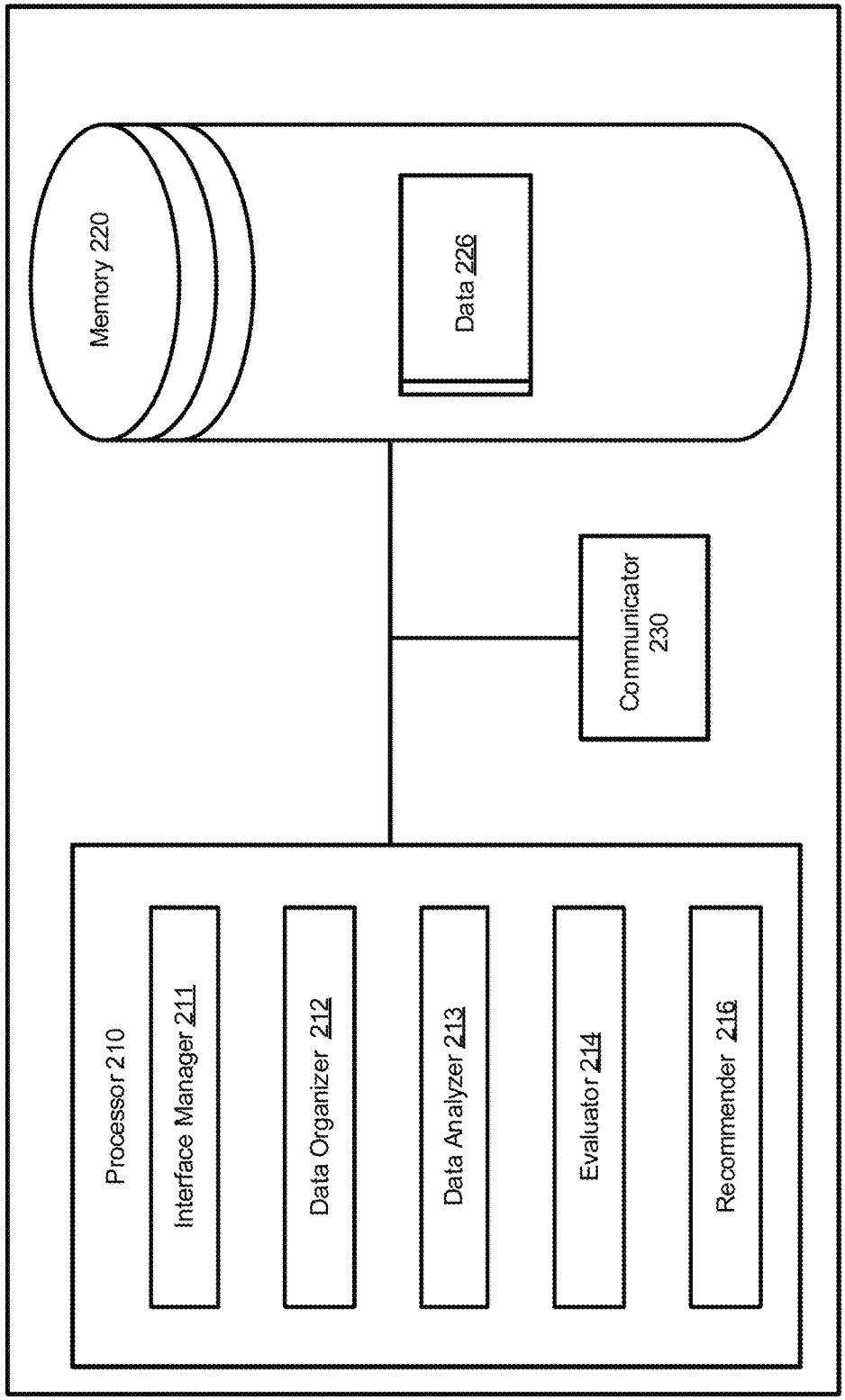
FIG. 2 is a schematic block diagram of an analysis device for evaluating malware classification sources, according to an embodiment.
Figure 3C:
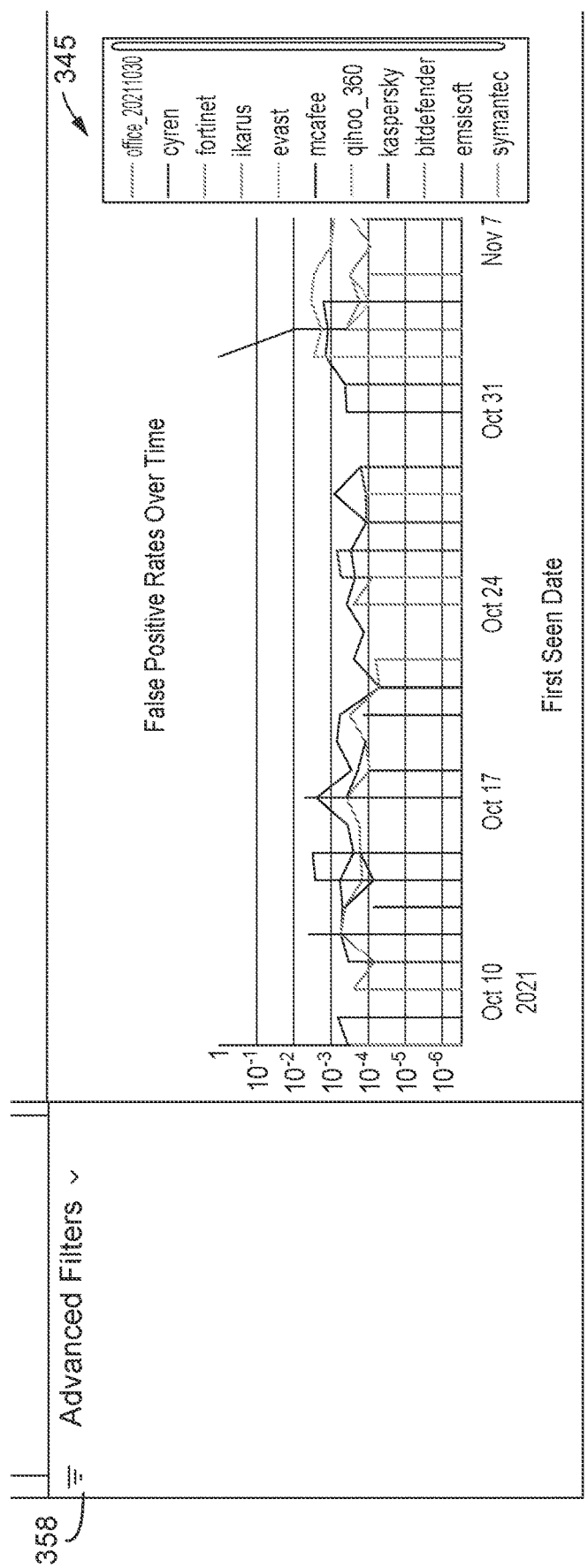
Figure 3D:
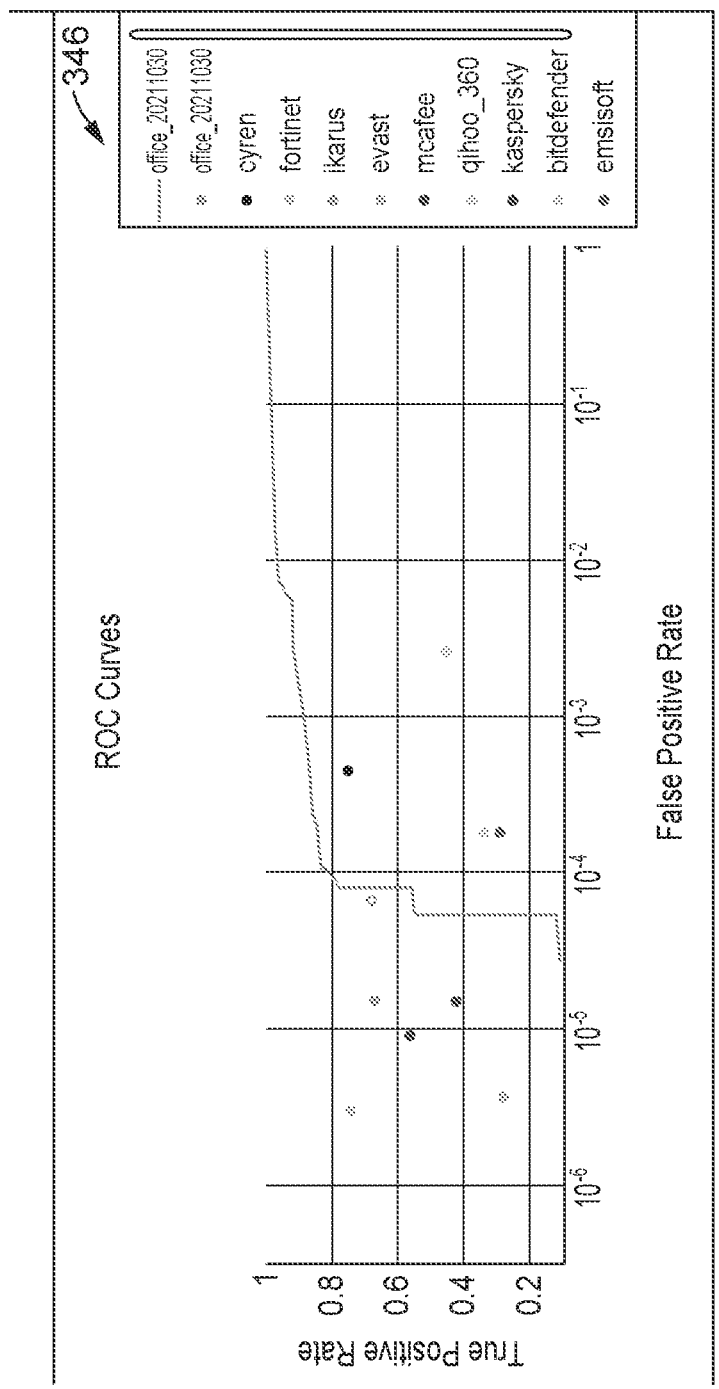

FIG. 2 is a schematic representation, of an analysis device 201, of an analysis system similar to the analysis system 100 shown in FIG. 1. The analysis device 201 can be substantially similar in structure and/or function to the analysis device 101 of FIG. 1. The analysis device 201 can be a hardware-based computing device, a multimedia device, or a cloud-based device such as, for example, a compute device, a server, a desktop compute device, a laptop, a smartphone, a tablet, a wearable device, a remote computing infrastructure, and/or the like. The analysis device 201 includes a processor 210, a memory 220 and a communicator 230. The analysis device 201 is depicted in FIG. 2 to have one processor, one memory, and one communicator for illustrative purposes only, and a similar analysis device can include any number of processors, memories, and/or communicators, in any suitable configuration as needed.

The analysis device 201 can be configured to receive data from data sources (e.g., data sources 102-104 of system 100 shown in FIG. 1) via the communicator 230 (e.g., operatively coupled to a communication network, such as communication network 106 of FIG. 1). The data received from data sources can be stored in the memory 220 and accessed by the processor 210 to analyze and evaluate the performance of one or more sources of classification of maliciousness and/or the quality of the classifications of the artifacts provided by the sources of classification, as described herein.

The memory 220 of the analysis device 201 can be, for example, a random-access memory (RAM), a memory buffer, a hard drive, a read-only memory (ROM), an erasable programmable read-only memory (EPROM), and/or the like. The memory 220 can store, for example, one or more software modules and/or code that can include instructions to cause the processor 210 to perform one or more processes, functions, and/or the like (e.g., Interface Manager 211, Data Organizer 212, Data Analyzer 213, Evaluator 214, and Recommender 216, shown in FIG. 2). In some implementations, the memory 220 can be a portable memory (e.g., a flash drive, a portable hard disk, and/or the like) that can be operatively coupled to the processor 210. In some instances, the memory can be remotely operatively coupled with the analysis device 201, for example, via the communicator 230. For example, a remote database server can be operatively coupled to the analysis device 201.

The memory 220 can store data 226. The data 226 can include data received from data sources (e.g., data sources 102-104 of system 100 in FIG. 1). As described with reference to the data sources 102-104 and the analysis device 101 of system 100, the data received by the analysis device 201 from data sources can include information associated with potentially malicious artifacts, each artifact being annotated to include or otherwise be associated with indications of classification of maliciousness by one or more sources of classification of maliciousness. For example, the data 226 can include information associated with multiple artifacts. Each artifact can be associated with an indication of a degree or classification of maliciousness provided by one or more sources of classification (e.g., vendors and/or engines of classification of maliciousness, etc.). The one or more sources of classification can include classifiers based on machine learning (ML) models, classifiers based on human curators, computer-based classifiers supervised by human curation, signature or rule-based classification systems, classification by engines operated by vendors of anti-virus or anti-malware applications and/or services, databases maintained for research into malicious artifacts and/or classifiers of maliciousness, and/or the like. In some implementations, the data associated with the artifacts from multiple sources of classification of maliciousness can include curated or annotated data associated with artifacts that have been studied and/or labeled previously. In some implementations, the data associated with the artifacts from multiple sources of classification of maliciousness can be non-curated production data associated with real-world network communications.

The data 226 can include data associated with (e.g., data used by, or data generated by) one or more processes, components, or routines implemented by the processor 210 to analyze and/or evaluate sources of classification of maliciousness and/or quality of data associated with sources of classification of maliciousness. For example, the data 226 can include data used by or associated with the interface manager 211, the data organizer 212, the data analyzer 213, the evaluator 214, and/or the recommender 216. For example, the data 226 can include data generated by the interface manager 211 to generate a user interface (e.g., displayed at the analysis device 201 or at a compute device such as compute device 105 of FIG. 1) that can be configured to provide a user with control tools that can be used to provide instructions, and based on the instructions, implement the data analysis and/or evaluation of performance of sources of classification and/or data quality, to provide a visualization of the performance and/or data quality via the interface. As another example, the data 226 can include data generated by the recommender 216 to indicate potential actions, selected based on the evaluation of sources of classification and/or data quality, that can be implemented and/or recommended by the analysis device 201. In some instances, the recommender 216 can, for example, be configured to send recommendations and/or instructions to another component of the processor 210, for example, a process configured to train an MIL model (not shown in FIG. 2) to classify artifacts based on their maliciousness, the model being a source that was evaluated by the evaluator 214). In some instances, the recommender 216 can be configured to send instructions and/or recommendations to external devices, for example, one or more compute devices, proxies, and/or servers (not shown in FIG. 2) to execute or carry out one or more actions based on the results of the recommender 216 (e.g., block communications, quarantine files or artifacts, retrain classifiers, retrain an identified source of classification that is evaluated based on results of evaluation, discard data sources, etc.). The recommender 216 can be configured to send instructions and/or recommendations automatically and/or upon request. For example, the recommender 216 can be configured to evaluate performance of sources and/or quality of data periodically and automatically send recommendations when specified conditions are met (e.g., a specified decline in performance or quality, or a specified improvement in performance or quality, or a specified maintenance in performance or quality). In some instances, the recommender 216 can send instructions or recommendations to external devices using the communicator 230 and via a communication network (e.g., communication network 106 of system 100 in FIG. 1).

The communicator 230 can be a hardware device operatively coupled to the processor 210 and memory 220 and/or software stored in the memory 220 executed by the processor 210. The communicator 230 can be, for example, a network interface card (NIC), a Wi-Fi™ module, a Bluetooth® module and/or any other suitable wired and/or wireless communication device. The communicator 230 can include a switch, a router, a hub and/or any other network device. The communicator 230 can be configured to connect the analysis device 201 to a communication network (such as the communication network 106 shown in FIG. 1). In some instances, the communicator 230 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 230 can facilitate receiving and/or transmitting data, artifacts, information associated with artifacts (e.g., classification of artifacts), and/or other information, communication, or instruction through a communication network (e.g., the communication network 106 in the system 100 of FIG. 1). In some instances, received data can be processed by the processor 210 and/or stored in the memory 220 as described in further detail herein. In some instances, as described previously, the communicator 230 can be configured to send data collected and/or analyzed by one or more components of the processor 210 (e.g., the interface manager 211, the data organizer 212, the data analyzer 213, the evaluator 214, and/or the recommender 216) to an external device (e.g., a server, a proxy, a compute device such as compute device 105 of FIG. 1, etc.) of an analysis system to which the compute device 201 is connected. The communicator 230 can also be configured to send data collected and/or generated by the processor 210 and the results of any analysis conducted by the processor 210. For example, the communicator 230 can send results of evaluation of performance of sources of classification at classifying potentially malicious artifacts (e.g., an external data source, or an internally maintained data source, an ML model trained to classify potentially malicious artifacts, etc.). The communicator 230 can send (e.g., to a compute device such as compute device 105 of FIG. 1) results of evaluation of quality of data associated with classification of potentially malicious artifacts by one or more sources of classification. The communicator 230 can send recommendations based on the evaluation of performance and/or data quality to perform one or more actions (e.g., to retrain an ML model, to block a source or communication, etc.). The communicator 230 can send recommendations of actions to a compute device, proxy, server, etc. of an analysis system to which the compute device 201 is connected.

The processor 210 can be, for example, a hardware based integrated circuit (IC), or any other suitable processing device configured to run and/or execute a set of instructions or code. For example, the processor 210 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 210 is operatively coupled to the memory 220. In some embodiments, for example, the processor 210 can be coupled to the memory 220 through a system bus (for example, address bus, data bus and/or control bus).

The processor 210 includes and/or is configured to execute an interface manager 211, a data organizer 212, a data analyzer 213, an evaluator 214, and a recommender 216. The interface manager 211, the data organizer 212, the data analyzer 213, the evaluator 214, and/or the recommender 216 can be software stored in memory 220 and executed by processor 210 (e.g., code to cause the processor 210 to execute the interface manager 211, data organizer 212, data analyzer 213, evaluator 214, and/or recommender 216 can be stored in the memory 220) and/or a hardware-based device such as, for example, an ASIC, an FPGA, a CPLD, a PLA, a PLC and/or the like.

The interface manager 211 can be configured to generate a user interface that can be used to receive instructions from a human user (e.g., from compute device 105 via communication network 106 of FIG. 1) based on which data from data sources can be collected by the processor 210. The interface 350 shown and described with reference to FIGS. 3A-3D, 4, 5 and FIGS. 7A-7B, 8, 9A-9B, 10A-10C, and 11 is an example interface that can be implemented by the interface manager 211. The interface 350 is described in further detail herein with reference to FIGS. 3A-3D, 4, 5 and FIGS. 7A-7B, 8, 9A-9B, 10A-10C, and 11. In some implementations, the interface manager 211 can provide an interface (e.g., interface 350 described herein) or data associated with the interface to a compute device (e.g., compute device 105) to be presented on the compute device, for example, via a display coupled to the compute device. The compute device can be configured to interact with the analysis device 101 via the interface manager 211, and interface can used be used to provide instructions to analysis device 101.

The interface manager 211 can be configured to generate the interface 350 shown in FIGS. 3A-3D, for example, to provide control tools (e.g., selectable, fillable, and/or clickable tools 352, 354, 356, 358, 360, 362, and 364, shown in FIGS. 3A-3D), that when activated can initiate various processes such as, for example, selection and/or application of filters to data (352), selection of data sources (353), selection sources (e.g., models) to evaluate (354), selection of data sources the performance of which to compare (356), selection and/or application of advanced filters 358, selection and display of results of evaluation of the sources via model metrics (360), selection and display of predictions (362), etc., as described in further detail herein.

The data organizer 212 is configured to receive the data including information associated with classifications of maliciousness of artifacts based on data sources including multiple sources of classification of maliciousness. In some instances, the data organizer 212 can be configured to organize the data such that each annotation provided by each source of classification is documented to be analyzed for quality of the annotation/classification. The data organizer 212 can be configured to use the information to generate an integrated or unified label for each artifact in a sample set, the label being based on classifications by multiple data sources. In some instances, the data can include scores provided for each artifact by one or more sources of classification (e.g., vendors of anti-malware products or services, engines (e.g., ML, models) of classification, human curators or computer-based systems assign signatures associated with artifacts, etc.).

In some instances the data organizer 212 can be configured to organize or group data based on any suitable parameter or property associated with the artifacts, including for example, size, file type of the artifacts (e.g., documents, images, executable files, etc.), file extension (e.g., .doc, .pdf, .xls, .rar, .xml, .gif, etc.), based on the nature of each artifact being signed or unsigned, categories associated with the artifacts (e.g., categories of URLs), family of malware that each artifact is identified to be associated with and/or a measure of degree of association with families of malware (e.g., ransomware, trojan, wormware, etc.). For example, the artifacts can be files and the data organizer 212 can be configured to group the files based on file extensions associated with each file. In some instances, the data organizer 212 can be configured to organize data based on family of malware identified to associated with each artifact, the family indicating a type of malware.

The data organizer 212 can be configured to organize data associated with building and/or maintaining an identified source of classification. As an example, the data organizer 212 can build and/or define training data to be used to train an identified source of classification such as a machine learning model, a rule-based or signature-based classification system, a cohort of individuals or professionals trained to manually curate potentially malicious artifacts, and/or the like.

In some implementations, the data organizer 212 can be configure to collect and organize information associated with each artifact, the information including suitable definitions or properties associated with each artifact, telemetry information associated with each artifact, prior labels indicating maliciousness associated with each artifact, historical information associated with an introduction or pattern of distribution, a process of attack mediated by each artifact if malicious, a family of maliciousness that each artifact belongs to if malicious, a history of treatment of artifacts of an identified type by one or more sources of classification, and/or the like.

Telemetry information can include any suitable information associated with an artifact including identity of the source or sources of classification that have scanned an artifact and the source or sources that have provided a score indicating maliciousness of the artifact, information related to prior or projected use of the artifact (for example, if the artifact is a file, information related to an identity of location (e.g., geographical and/or electronic), time, identity of an endpoint, and other parameters associated with an execution or distribution of the file), internal (e.g., within an organization using the analysis device 201) or external indications of reputation associated with the artifact, scores provided by one or more sources of classification indicating the maliciousness of the artifact, credibility associated with the one or more sources of classification indicating the maliciousness of the artifact, a path taken by the artifact or communications carrying the artifact in being delivered at a particular endpoint where the artifact was detected, modes of distribution of the artifact, any human rules associated with the artifact or other similar artifacts (e.g., of the same file type, class, signed/unsigned nature, functionality associated with the artifact (e.g., executable), etc.). In some instances, data organizer 212 in an analysis device 201 implemented by an organization can include and organize internal telemetry information based on information obtained internal to the organization (e.g., private labels, rules, reputation indicators, or classifications assigned to identified artifacts, information related to distribution, delivery, usage of the artifacts, etc. based on one or more properties of the artifacts). In some instances, data organizer 212 in an analysis device 201 implemented by an organization can include external telemetry information based on information obtained from external sources (e.g., labels, scores, rules, reputation indicators, or classifications assigned to identified artifacts, information related to distribution, delivery, use of the artifacts, etc., based on one or more properties of the artifacts). In some implementations, the analysis device 201 can use internal telemetry by matching the internal telemetry information with external telemetry information for artifacts or types of artifacts, to evaluate a performance of an identified source of classification (e.g., a ML model trained to classify artifacts based on maliciousness) using ground truth data generated from selecting a subset of artifacts for which information is available via internal and external telemetry.

The data analyzer 213 included in the processor 210 can receive data from the data organizer 212 and be configured to convert a score provided by a source of classification for an artifact into a classification of maliciousness based on one or more inputs such as threshold criteria from a user. For example, data analyzer 213 can convert a score of 30 into a classification of "maliciousness" on a binary class differentiation of benign and malicious, based on comparing the score 30 against a first criterion indicating a threshold score value of 25. The data analyzer 213 can use the classification to generate an integrated or unified label associated with each identified artifact or each identified class of artifacts from a selected subset of artifacts. The label for each artifact can be based on classification of that artifact by data sources, obtained from the data organizer 212. The integrated or unified label can be used to generate ground truth data (e.g., by matching artifacts based on internal and external telemetry). The ground truth data can be used to evaluate a particular identified source of classification (e.g., a machine learning model trained to classify potentially malicious artifacts).

The data analyzer 213 can receive inputs, via an interface, indicating a selection of a subset of sources (e.g., an identified set of sources of classification such as a named list of vendors or engines that are associated with higher credibility and/or performance) of classification of maliciousness from the multiple sources of classification of maliciousness available to be used. The data analyzer 213 can select the identified subset of sources of classification based on the input, and define a dataset including artifacts to be included in the generation of a unified label and/or a ground truth indication. The data set can be drawn from the data associated with the sources of classification. The data set can include information associated with a set of artifacts such that each artifact from the set of artifacts has at least one score indicating a classification of maliciousness based on at least one source of classification from the subset of sources of classification of maliciousness that were selected.

The data analyzer 213 can then convert the score provided by each source into a classification based on a first criterion (or any suitable number of criteria, in some implementations, where more than two classes may be defined), that is predetermined and indicating a threshold value differentiating between classes of maliciousness. The data analyzer 213 can determine a unified label indicating a classification of maliciousness for each artifact from the set of artifacts based on classifications or indications of maliciousness for that artifact from the subset of sources of classification. In some implementations, the data analyzer 213 can receive, via an interface (e.g., interface 350 described herein) a first criterion indicating a threshold condition that is to be met for each artifact scored by one or more sources of classification to be classified in a specified manner. Said in another way, the data analyzer 213 can receive scores associated with an artifact, each score being provided by a source of classification, and use the first criterion to interpret or convert the score into a classification of maliciousness. In some implementations, the scores received from a source of classification can be normalized according to a predetermined method to be compatible with a predetermined process of applying a threshold criterion. In some implementations, the scores received from a source of classification can be raw scores that are already compatible with a predetermined process of applying a threshold criterion due to the interface being adapted to a format of input from one or more sources of classification.

As an example, the data analyzer 213 can receive a first criterion via a filter implemented in an interface (e.g., filter 374 implemented in the interface 350 described herein, and shown in FIG. 5) indicating a threshold score of 26. The first criterion of the threshold score of 26 can indicate that any artifact that receives a score greater than 26 by one or more of the sources of classification, from the subset of sources of classification that have been selected, is to be classified by the data analyzer 213 as malicious.

In some implementations, the data analyzer 213 can receive a second criterion, via an interface (e.g., interface 350) indicating a threshold number of scores from a minimum number or fraction or percentage of sources of classification, from the subset of sources of classification of maliciousness that were selected, that is desired to meet a condition of confidence associated with the unified label. For example, data analyzer 213 can receive a second criterion via a filter implemented in an interface (e.g., filter 376 implemented in the interface 350 described herein, and shown in FIG. 5) indicating a threshold percentage of 50% of the sources of classification included in the subset of sources of classification of maliciousness that were selected. The second criterion of the threshold percentage of 50% can indicate that any artifact that has received a valid score by at least 50% of the sources of classification, from the subset of sources of classification that have been selected, is to be considered and included in defining the dataset used to generate a unified label. The second criterion can be used to reconcile with missing data where some artifacts are scored by a large portion of the selected sources of classification, but not all of the selected sources of classification. As an example, if 10 sources are identified, a first artifact may be associated with a score or classification from 4 of the 10 sources. Based on a criterion of selection only artifacts with scores or classifications from greater than 50% of the sources of classification, at 376, the first artifact would not be selected. A second artifact may be scored by 6 of the 10 sources. Of the 6 sources that provided a score for the second artifact, 3 of them may have scored it above 26 (in a raw or normalized score) indicating a classification of malware. Thus, based on selecting 26 at 374, the unified label for the second file is malicious. Alternatively, the sources of classification may provide binary classifications of "malicious" or "benign". The second artifact may be classified by 6 of the 10 sources. Of the 6 sources that provided a classification for the second artifact, 3 of them may have classified it as malware. Thus, based on selecting 26 at 374, and 3 out of 6 being greater than a 26%, the unified label for the second file is malicious.

The data analyzer 213 can determine a unified label (e.g., malicious, benign, label indicating a degree or type of maliciousness, etc.) that integrates the information provided by the subset of sources of classification selected by a user, notwithstanding any missing data issues or potential bias in any individual source of maliciousness. The data analyzer 213 can determine the unified label for an artifact using any suitable method. For example, the data analyzer 213 can use a predetermined threshold criterion that indicates a minimum number of the selected subset of sources of classification that have provided scores resulting in a classification of "malicious" after applying the first criterion and/or the second criterion described above. In some implementations, the data analyzer 213 can use a specified strategies of identifying key sources of classification among the subset of sources of classification to relay on. The key sources can be identified using any suitable procedure. For example, the key sources can be identified based on past record of being reliable, record of being non-redundant or complementary, past superlative performance on a type of artifacts (e.g., .doc files, or artifact with a specified telemetry information, or artifacts associated with a specified signature, etc.) that are under consideration in given test case. For example, the data analyzer 213 can use a threshold criterion that indicates a minimum number of the identified key sources of classification that have provided scores resulting in a classification of "malicious" after applying the first criterion and/or the second criterion described above. When the threshold condition of being identified as "malicious" by the minimum number of the identified key sources of classification is satisfied, the data analyzer 213 can assign a unified label of "malicious" to the artifact.

While described here as receiving scores from the sources of classification, in some implementations, the sources of classification can provide classifications of maliciousness of each artifact. For example, a source of classification can provide an indication of classification for each artifact, the indication chosen between the binary classes of "malicious" or "benign". The data analyzer 213 can receive a first criterion via a filter implemented in an interface (e.g., filter 374 implemented in the interface 350 described herein, and shown in FIG. 5) indicating a threshold value of 26. The first criterion of the threshold value of 25 can indicate a minimum number (e.g., 26 of 30 sources) or fraction (e.g., 26% of sources) of the sources from the subset of sources of classification that indicate a classification of "malicious" for that artifact to be assigned a unified label of "malicious" by the data analyzer 213. Once the first criterion is met for an artifact, the data analyzer 213 can assign a unified label of "malicious" to that artifact.

The data analyzer 213 can use the unified label to generate ground truth indication of each artifact in a sample set of artifacts that can then be used to evaluate a performance of an identified source of classification of maliciousness. The data analyzer 213 can be configured to generate and store the ground truth data such that the ground truth data can be used to compare against a classification of artifacts by an identified source of classification that is to be evaluated. For example, the ground truth data can be used to evaluate an external source of classification or engine (e.g., provided by a vendor of anti-malware services). In some implementations, the ground truth data can be used to evaluate an identified source of classification that is being built and/or maintained internally in an organization using the analysis device 201. For example, the ground truth data can be used to evaluate an ML model trained to classify artifacts based on maliciousness.

In some implementations, the data analyzer 213 can be configured to receive new data indicating a classification, by one or more sources, of an already scanned artifact or artifacts, that is different from the indications that were previously received. The data analyzer 213 can be configured to redefine the dataset based on the new data or new information and generate an updated label for the artifact the updated label reflecting and/or incorporating any difference indicated by the new data compared to the prior indications of classifications of maliciousness for that artifact. The updated label can be used to generate an updated ground truth indication of classification of maliciousness of that artifact. In some implementations, the data analyzer 213 can be configured to automatically receive new data (e.g., via periodical reception of data from data sources) and automatically update labels such that the ground truth indications generated based on the labels can include up-to-date information associated with the sample artifacts being used.

In some implementations, the ground truth data can be used by the data analyzer 212 to compare against new data received from external sources to evaluate the new data for quality control. Some such comparisons can be used to identify problem areas in the performance of one or more sources.

The evaluator 214 can be configured to evaluate one or more identified sources of classification based on the ground truth indications generated by the processor 210. The evaluator 214 can receive ground truth indications of maliciousness (e.g., ground truth data based on unified labels generated by the data analyzer 213) and compare the ground truth indications against indications of maliciousness generated by the one or more identified sources of classification and/or each identified source of classification (e.g., an ML, model, external engine, vendor data, data from a database or repository, etc.) that is to be evaluated. The evaluator 214 can calculate metrics of performance of each source of classification and/or each identified source of classification (e.g., a ML model) that is to be evaluated to indicate the performance of that source. The metrics can include detection rate or true positive rate per source of indicated by an obtained by evaluating the performance based on classification of a set of artifacts by the identified source of classification compared to ground truth indications of maliciousness associated with the set of artifacts. Performance metrics of each identified source of classification can include false positive rate per source of classification, detection rate, detection ratio, true positive rate as a function of time, false positive rate as a function of time, a ratio of samples of artifacts that were scanned by each source of classification and assigned a score or classification (e.g., malicious or benign or unknown) to sample of artifacts identified as malicious or benign or unknown based on ground truth indications, receiver operating conditions (ROC) quantifying a number or rate of true positive identification of artifacts as malicious compared to number or rate or false positive identification of artifacts as malicious.

Performance metrics can include precision or positive predictive value determined as a fraction or proportion of identified instances among the retrieved instances. Precision, otherwise referred to as positive predictive value, can also be determined as the ratio of number of true positive identifications (e.g., as malware) to the total number of identifications of artifacts (e.g., as malware). Performance metrics can include recall determined as a fraction or proportion of relevant instances that were retrieved. For example, recall can be represented as a number of correctly identified artifacts (e.g., identified as malware) divided by the total number of true artifacts of that type in the sampled data (e.g., total number of artifacts that are true malware in the sampled data set). In some implementations, performance metrics can also include a measure of confidence associated with a classification of an artifact, a measure of a metric as a function of time, a distribution of scores associated with a set of artifacts of an identified category or type, a distribution of ground truth indications of maliciousness of a set of artifacts based on selection of data from information obtained from sources of classification, measures or aggregate measures or statistics of metrics (e.g., mean, average, standard deviation, etc.) associated with artifacts grouped by one or more properties associated with the artifacts, and/or the like. Distributions can be plotted in any suitable format using any suitable scales. For example, distributions can be plotted as bar plots, scatter plots, line plots, etc., using any suitable scale including linear, circular, logarithmic, exponential, and/or the like. In some implementations, the evaluator 214 can generate performance metrics directed to the performance of sources of classification in treating artifacts of a particular type or category. Identified types can include artifacts beyond and/or less than a predetermined size, files of a given filetype, artifacts identified by nature of being signed or unsigned, artifacts based on any associated encryption, artifacts that are likely part of an identified family of malware, artifacts having an identified extension (e.g., .doc, .ppt, .pdf, .rar, .exe, .rtf, etc.) and/or the like.

The recommender 216 can be configured to receive results from evaluation of identified data and/or one or more identified sources of classification, and provide recommendations based on the results. For example, the recommender 216 can determine a performance of a particular source of classification to be declining and recommend a reduced reliance on that source of classification. As another example, the recommender 216 can determine performances of a set of sources of classification to be correlated (e.g., correlation greater than a predetermined threshold) and based on this determination recommend that the set of sources not be simultaneously relied upon, and/or indicate that the identified set of sources can be redundant when combined together, or provide a warning that the set of sources can not be treated as independent sources of classification. In some implementations, the recommender 216 can receive statistics associated with performance metrics for specific types of data (e.g., data received within a defined time window or received from a defined source, or data associated with a defined telemetry information, etc.) and/or artifacts (e.g., types of files or artifacts based on properties of artifacts). Based on the statistics and/or performance metrics, the recommender 216 can provide recommendations for continued use and/or reliance on the data, data sources, and/or source of classification for that particular data type. In some implementations, the recommender 216 can receive a determination of maliciousness of an artifact based on output of an identified source of classification (e.g., an identified ML model) that had been evaluated by the analysis device 201. Outputs of the identified source of classification (e.g., an identified ML, model) can be in any suitable format and can be suitably transformed to be compatible with a format association with the analysis device described herein. Based on the determination of maliciousness, the recommender 216 can provide recommendations to handle the artifact. Recommendations can include quarantining the artifact, blocking one or more communications associated with the artifact, blocking a communication source associated with the artifact, and/or the like.

In use, the processor 210, included in the analysis device 201, can be configured to receive data associated with multiple sources of classification of maliciousness. The data includes information associated with a group of artifacts. Each artifact from the group of artifacts is associated with at least one score indicating a classification of maliciousness of that artifact based on at least one source of classification from the multiple sources of classification. For example, the multiple sources can be vendors of anti-malware products or services, vendors of annotated data indicating maliciousness of artifacts, databases containing data including artifacts annotated for maliciousness, and/or the like.

The processor 210 can organize the data based on properties associated with the group of artifacts including type of artifacts, file extensions if the artifacts are files, size, singed/unsigned property, telemetry information associated with each artifact, potential malware family that the artifact might belong to, categories of URL is the artifact is a URL, and/or the like. The processor 210 can receive instructions via an interface (e.g., interface 350 described herein) to select a subset of sources of classification of maliciousness from the multiple sources of classification of maliciousness. For example, the processor 210 can select, based on the instructions, a subset of named sources (e.g., names of vendors like Avast, Bitdefender, MacAfee, Symantec, etc.). The processor 210 can define a dataset by obtaining data from the data associated with the multiple sources of classification, such that the data set includes information associated with a set of artifacts from the group of artifacts. The processor 210 includes artifacts in the data set by virtue of the artifacts being scanned by at least one of the selected subset of sources of classification. The processor 210 can include data associated with artifacts in the data set based on each artifact being associated with at least one score by at least one of the sources of classification, the score indicating a maliciousness of the artifact.

In some implementations, the inclusion of data associated with artifacts can be more or less stringent based on instructions received via the interface. For example, in some implementations, the processor 210 can include data associated with all artifacts that have been scanned and/or scored by at least one of the selected sources of classification, regardless of the actual scores and/or the number of scores associated with each artifact (i.e., number of sources that have scored each artifact). The predetermined rules can be derived from instructions sent via the interface in the form of a threshold criterion (e.g., by implementing one or more filters, as described herein). In some implementations, the processor 210 can further constrain the data set by implementing one or more selection filters providing additional threshold criteria. In some implementations, the processor 210 can include only data associated with artifacts that have been scanned and/or scored by all of the selected sources of classification. In some implementations, the processor 210 can include only data associated with artifacts that meet the criterion of having been scanned and/or scored by at least a minimum number (or percentage) of the selected sources of classification. For example, the processor 210 can include in the data set only data associated with artifacts that have been scanned and/or scored by at least 50% of the selected sources of classification. This selection strategy can also be used by the processor 210 to handle issues from missing data. For example, an artifact may be associated with a reliable score from a majority of the sources but may lack a score from a few sources. In such a scenario, the data associated with the artifact from the sources that have assigned a score for the artifact can still be used by the processor 210 to generate the unified label, while carefully monitoring and controlling quality of data used, without compromising quality of data included in the data set, by implementing the above-described filter to select artifacts that have scores from at least a minimum number or proportion of the selected sources. In some implementations, the processor 210 can further constrain the data set by implementing any suitable filter based on any suitable property of the artifacts, including file type, file size, family of malware indicated, etc.

The processor 210 can then use the data set to assign a unified label to each artifact in the data set. The processor 210 can assign a classification for each artifact based on the score for that artifact meeting a threshold criterion. For example, the processor 210 can assign a classification based on a threshold criterion of the score being a minimum value to indicate maliciousness. For example, all artifacts having a score greater than 25 will be assigned a classification of maliciousness. The processor 210 can then compare the classifications for that artifact based on multiple sources of classification and assign a unified label for that artifact. For example, the processor 210 can determine that 90% of the sources in the subset of sources of classification have scored that artifact in such a manner that the conversion using the threshold criterion has resulted in a classification of malicious. Based on this determination the processor 210 can assign a unified label of malicious to that artifact. As described herein, in some implementations, the processor 210 can receive classifications instead of scores from sources of classification. The processor 210 receive a threshold criterion (e.g., 26%) indicating a minimum fraction of a selected subset of sources of classification that is desired to have classified as artifact as "malicious" (or "benign") for that artifact to be assigned a label of "malicious" (or "benign").

The processor 210 can use any suitable rule or condition in comparing the classifications by multiple sources and generating the unified label. As an example, the processor 210 can use a "at least by X number/fraction of sources rule" wherein if an artifact is classified as malicious by at least X number or X fraction of the sources in the subset of sources of classification, then the artifact receives a unified label of malicious. If not it gets labeled benign or unknown. In some implementations the processor 210 can use one or more user inputs or predetermined values, for example in the form of threshold values, to determine the unified label associated with an artifact. The processor 210 uses the unified label of each artifact in the data set to generate a ground truth data of a desired collection of artifacts. The processor 210 then uses the ground truth data to compare the classification of same or similar artifacts in the desired collection (e.g., artifacts matched based on internal and/or external telemetry as described herein) by any one or more identified sources of classification. The processor 210 can evaluate the performance of the one or more identified sources of classification based on the comparisons. The processor 210 can also evaluate the quality of data based on monitoring performance of the individual sources of classification that have been selected to be included in the data set using one or more metrics such as detection rate, false positive rate, portion of artifacts scanned, precision, recall, etc. The processor 210 can evaluate quality of data that has been included in the data set and update the quality at any point by changing the criteria for selection of data and/or the criteria for assigning the unified label for the artifacts as malicious or benign.

The processor 210 can automatically update the ground truth data in response to a query or request to generate a ground truth data and/or to evaluate performance of one or more identified source of classification and/or data associated with one or more sources of classification. The processor 210 can also segregate artifacts into data types based on one or more properties, such that the data set is focused on one or more data types. Thus, the processor can evaluate performance of one or more identified source of classification and/or data associated with one or more sources of classification as a function of data types.

In some implementations, the processor 210 can then generate recommendations, based on the evaluation of performance of one or more identified source of classification and/or data associated with one or more sources of classification, either automatically or upon a query or request from a user via the interface. For example, the processor 210 can recommend an increased or decreased reliance (by an organization using the analysis device 101) on one or more sources of classification. As another example, the processor 210 can monitor and/or determine, upon evaluation, a first source of classification has declined in performance over a period of time. The processor 210 can recommend, based on this determination, that a security system switch from relying on the first source of classification to relying on a second source of classification which can also be recommend by the processor 210 based on its evaluation of the second source. The processor 210 can also recommend, for a target security system, reliance on a combination of sources, for example, sources that are determined to be complementary in their superior performance and coverage of classifying one or more classes or types of artifacts that best match the data traffic encountered by the target security system. The processor 210 can also identify that one or more sources of classification has declined for one or more identified types of artifacts (e.g., ".doc" files) and recommend excluding that type of artifact when relying on that source of classification to generate a ground truth data and/or when relying on that source to implement a security strategy. The processor 210 can implement any/all the above examples and/or other such evaluation and recommendation upon user request (e.g., via the interface) or automatically (e.g., on a periodical schedule) to improve an overall security strategy implemented by an organization or entity using the analysis device 201.

FIGS. 3A-3D show a schematic representation of an example interface 350 that can be used by an analysis device described herein to assign a unified label associated with each artifact from a set of artifacts, according to some embodiments. The unified label can be used to generate ground truth indications of maliciousness of artifacts that can be used to evaluate sources of classification as well as data associated with sources of classification. The interface 350 includes tools, like tool 353, to load data including information about artifacts, for example, source of the data, identity, types, properties, telemetry, classifications, prior labels, scores, other metrics, or measures, and/or annotations associated with each artifact about which the data includes information. The tool 353 can also indicate the data source that has been loaded (e.g., VirusTotal in FIGS. 3A-3D). The tool 353 also provides tools to provide inputs like a weighting function that should be applied to the artifacts and/or the data (e.g., "Uniform" weighting in FIGS. 3A-3D), a predetermined form of definition associated with "Benign" label assigned to an artifact and a predetermined form of definition associated with "Malicious" label assigned to an artifact (e.g., Benignware Definition and Malware Definition).

The interface 350 includes a first selection tool 354 that can be used to select an identified source of classification that is to be evaluated by the analysis system associated with the interface 350. For example, in FIGS. 3A-3D, the identified source of classification to be evaluated is "office_20211030." As described herein, while the example in FIGS. 3A-3D shows just one identified source that is to be evaluated, the interface 350 includes in the first selection tool 354 a method to include multiple identified sources to be evaluated by inputs provided in the portion entitled "Combination of Models to Evaluate". Thus, in some implementations, the interface 350 can include any suitable number of identified sources of classification to be evaluated using the ground truth indications generated.

The interface 350 includes a second selection tool 356 configured to provide an avenue (e.g., a drop-down menu that is activated when the downward arrow is selected) to select one or more sources of classification that can be used to generate a data set of artifacts. The data set of artifacts can be used to define a unified label associated with each artifact in the data set of artifacts based on which a ground truth indication of a sample set of artifacts can be generated. The sources selected in interface 350 include the eleven named sources of classification, also referred to herein as engines or vendors, including "Avast", "Bitdefender", "Cyren", "Emsisoft", "Fortinet", etc. shown in the selection window associated with selection tool 356. The interface 350 includes an advanced filter section 358 that is used to further define and/or constrain the data that is included in the data set of artifacts, as described herein. The application tool 352 is configured to initiate, upon activation, the application of all the selection and filter inputs provided via selection tools 352, 354, 356, and 358.

Interface 350 in FIGS. 3A-3D also includes a visualization portion that includes a Model Metrics visualization window 360 associated with a tab tool that activates the window, and a prediction breakdowns visualization window 362, also associated with a tab tool that activates the window. The model metrics visualization window (also referred to herein as "model metrics window") includes a set of graphical representations of measures of metrics of performance associated with the set of eleven sources of classification (also referred to herein as "engines") selected via the second selection tool 356 and the identified source to be evaluated. The model metrics window shows aggregate measures or measures of performance metrics associate with each source from the eleven sources in classifying a sample of artifacts for which there is ground truth data (e.g., from the unified label) generated using the selections and filters defined by selection tools 352, 354, 356, and/or 358 (and/or others not shown in FIGS. 3A-3D). The metrics are based on comparisons of the classification of maliciousness of each artifact in the sample set by each source from the eleven sources and a corresponding ground truth indication of maliciousness included in the ground truth data. The model metrics window 360 includes a set of windows 364 indicated by tools associated with each, labeled "Overall Performance", "Rates over times" "Data Monitoring", "ROC curves", and "All charts". In the example representation in FIGS. 3A-3D, the "All Charts" window is activated, indicated by the blue selection line under "All Charts".

Example graphical representations in the "All Charts" window includes plots of Detection rate associated with each source, as a bar chart indexed by color (color indicated by different cross hatchings), 341 (indicating a fraction of true detections of malicious artifacts by each of the sources organized on the x-axis), false positive rate associated with each source 342 (also as a bar chart indexed by the same scheme of color (as indicated by different cross hatchings) as in plot 341), and sample ratio associated with each source 343, also indexed by the same color scheme (as indicated by different cross hatchings) as 341 and 342, indicating total numbers and fractions of filtered artifacts that were included in the data set to generate the ground truth data in the total set of artifacts, the total set of malicious artifacts (malware total) and the total set of benign artifacts (benign total), as well as in the total set of unlabeled artifacts. The model metrics All Charts" window also includes a plot of detection rate over time 344 for each source, a plot of false positive rate over time 344 for each source, and a plot 346 of true positive rate as a function of false positive rate, at a selected threshold criterion condition for each of the eleven sources indicated by circle markers, with data associated with the model to be evaluated represented over a range of true positive and false positive rates, as a ROC curve indicated by the line. Plots 344-346 also represent each source by indexing them according to the same color scheme (each line on the chart being a different color representing a source) as plots 341-343. Sources that are associated with less than 95% of the scanned samples or artifacts that have been used to generate the ground truth data are highlighted by a red outline (shown as a thicker outline) around the corresponding bars in plots 341, 342, and 343 for ease of visualization by a user.

Figure 4:
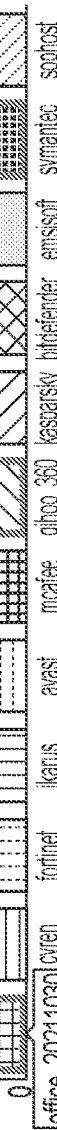
FIG. 4 shows an interface showing an example visualization of performance of malware classification sources and data associated with the malware classification sources, according to an embodiment.

In some embodiments, the interface 350 is configured to include a functionality that enables a user to manipulate the interface 350 via a suitable gesture to access additional or supplemental information associated with that feature of the plot. For example, the user can make a specified button selection gesture (e.g., predetermined keyboard button press, right mouse click, a double-click etc.), a pointer hover gesture, or the like, over a feature in a plot or graphical representation (e.g., a bar in a bar plot) to reveal information about the data that was used to generate the plot. FIG. 4 is a schematic illustration of the interface 350 of FIGS. 3A-3D showing such a functionality. As shown in FIG. 4, a pointer hover gesture over the bar 364 in the bar plot 341 brings up the information box 366 providing additional data associated with the bar 364.

FIG. 5 is a schematic illustration of the interface 350 of FIGS. 3A-3D and 4, including an expanded view of the advanced filter section 358, showing a set of selection tools to apply filters to the data included in the data set used to generate unified labels and/or ground truth indications of maliciousness, according to an embodiment. The advanced filter section 358 includes a first filter selection tool 372, a second filter selection tool 374, a third filter selection tool 376, and a fourth filter selection tool 378. The first filter selection tool 372, represented as a check box, is configured to receive an input from a user indicating an instruction to select only data associated with those artifacts (also referred to as "data samples" herein) that have been scored by all the sources of classification selected via the first selection tool 356 (e.g., eleven engines shown in selection box associated with first selection tool 356). The second filter selection tool 374 is represented as a sliding scale of score values with a pointer that can be moved along the scale and placed at a value indicating a selection. The second filter selection tool 374 is configured to receive a threshold criterion input that is used to convert scores provided by sources indicating maliciousness into a classification of maliciousness. The threshold condition can be used to set a level of stringency associated with how scores from sources are to be treated. The threshold criterion 25 provided by the second filter selection tool 374 in the example in FIG. 5 sets the criterion at a minimum value of 26 for determining a classification of an artifact as malicious, between malicious or benign, based on a score provided by a source of classification. As described herein, in some implementations, the interface 350 can receive classifications of maliciousness of artifacts from sources of classification (instead of scores). The interface 350 can receive the threshold criterion 26, provided by the second filter selection tool 374 in the example in FIG. 5, as an indication of a minimum fraction or percentage of the sources of classification (e.g., 26% of sources) that have classified an artifact as "malicious" (or "benign"). When the minimum fraction or percentage of the sources of classification is met for an artifact, the artifact can be assigned a label of "malicious" (or "benign").

The third filter selection tool 376 is configured to receive an input indicating a criterion of a minimum number or fraction of sources that have scored an artifact for that artifact to be included in a data set used to generate a unified label and/or a ground truth data. The third filter selection tool 376 is represented as a sliding scale of percentage values with a pointer that can be moved along the scale and placed at a value indicating a selected criterion of percentage of sources. The third filter selection tool 376 is configured to receive the threshold criterion input and reject artifacts that do not meet the criterion (i.e., artifacts for which there is missing data from one or more sources of classification). This threshold condition can be used to set a level of stringency associated with how artifacts that have not been scored by every source are treated by the analysis device associated with the interface 350. The threshold criterion 50% provided by the third filter selection tool 376 in the example in FIG. 5 sets the criterion at a minimum of scores from half of the eleven sources selected (i.e., minimum of scores from 6 sources) is to be met for an artifact to be included in the data set used to generate the unified label for that artifact.

The fourth filter selection tool 378 indicates a drop-down selection menu that can be used to select specified types of artifacts that can be used to generate a data set of artifacts of that specified type. Such a data set can be used in generating unified labels and ground truth data for artifacts of that specified type. The ground truth data specific to a type of types of artifacts can be used to evaluate the performance of one or more sources of classification for the specified types of artifacts alone. The ground truth data specific to a type of types of artifacts can be also used to evaluate the quality of data obtained for the specified types of artifacts.

Figure 6:
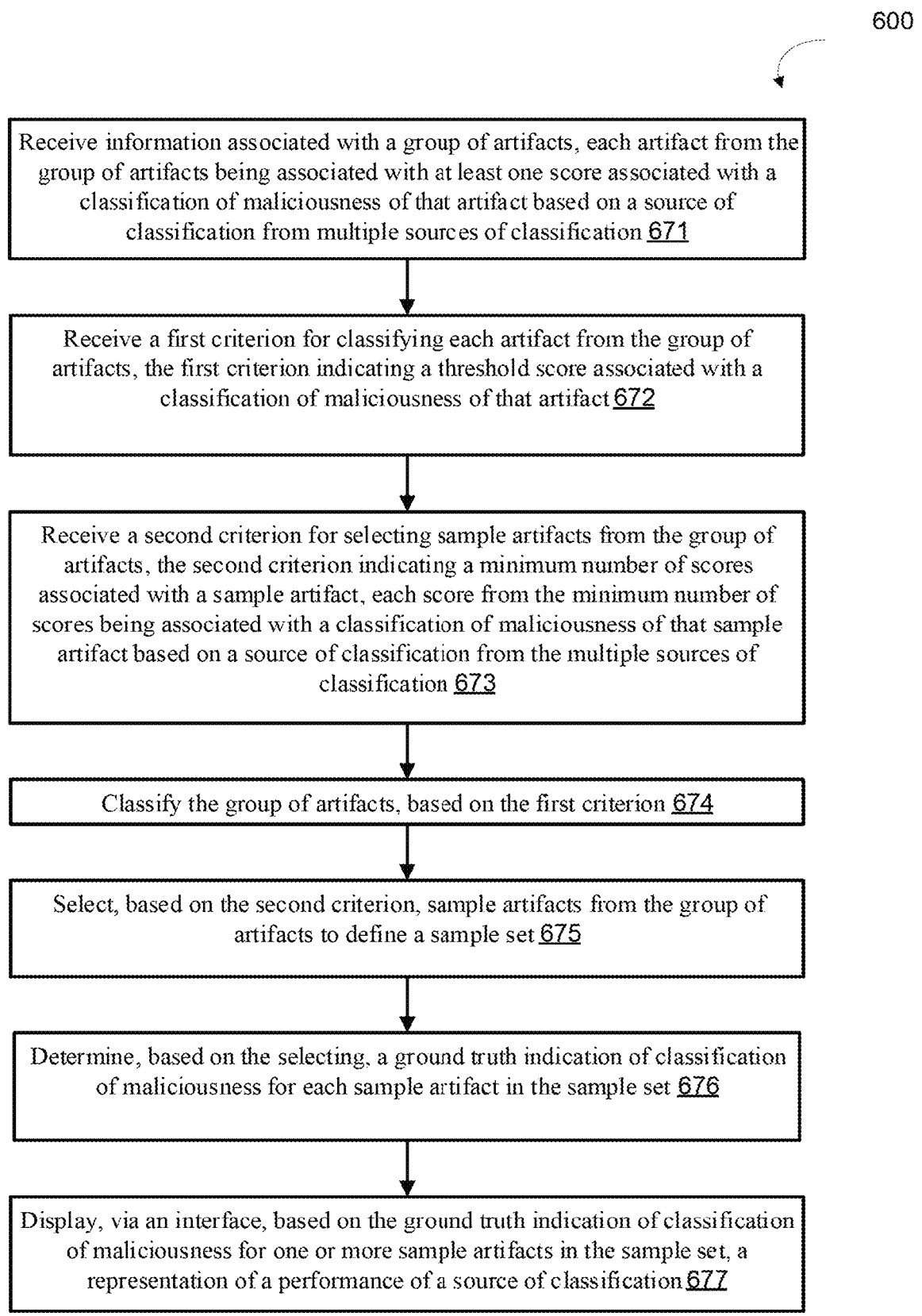
FIG. 6 is a flowchart representing a method of evaluating and visualizing the performance of malware classification sources and data associated with the malware classification sources, according to an embodiment.

FIG. 6 illustrates a flowchart describing an example method 600 of determining a ground truth indication of classification of maliciousness for a sample set of artifacts and using that to display a representation of a performance of a source of classification, according to an implementation. The method 600 can be implemented using an analysis device described herein (e.g., analysis device 101, 201) by one or more processors associated with the analysis device (e.g., processor 210). The method 600 includes, at 671, receiving information associated with a group of artifacts, each artifact from the group of artifacts being associated with at least one score associated with a classification of maliciousness of that artifact based on a source of classification from multiple sources of classification. As described herein, the sources can be repositories or aggregators of data associated with potentially malicious artifacts (e.g., Virus-Total), or other suitable databases, user devices, compute devices, and/or the like. The scores can be in any suitable form and the analysis device can be configured to adapt (e.g., adapt the interface) to be compatible with the form of scores.

At 672, the method includes receiving a first criterion for classifying each artifact from the group of artifacts, the first criterion indicating a threshold score associated with a classification of maliciousness of that artifact. For example, as shown in FIG. 5, the scores can be in a number ranging from 0 to 100. In some instances, the scores can be normalized to range from 0 to 100. The analysis device can be configured to adapt the interface, based on the form of scores, for providing inputs related to the first criterion, such the first criterion is received to be a threshold score value of 25 based on which the scores of individual artifacts can be converted to classifications.

At 673, the method includes receiving a second criterion for selecting sample artifacts from the group of artifacts, the second criterion indicating a minimum number of scores associated with a sample artifact, each score from the minimum number of scores being associated with a classification of maliciousness of that sample artifact based on a source of classification from the multiple sources of classification. As an example, shown in FIG. 5, the second criterion can be a minimum of 50% of the sources of classification having scored an artifact for that artifact to be considered for selection in determining a unified label for that artifact.

At 674, the method 600 includes classifying the group of artifacts based on the first criterion. As an example, shown in FIG. 5, artifacts with scores equal to or greater than 26 will be classified as malicious while the remaining with be classified as benign.

At 675 the method 600 includes selecting, based on the second criterion, sample artifacts from the group of artifacts to define a sample set. In an example implementation, as shown in FIG. 5, the artifacts that are scored by more than six of the sources of classification will be selected to be included in a data set in which the scores of the individual artifacts will be converted to a classification chosen from the binary classes of "malicious" and "benign". The artifacts in the sample set can be then assigned a unified label by comparing the classification associated with each source of classification with the remaining sources of classification as described herein.

At 676, the method 600 includes determining, based on the selecting, a ground truth indication of classification of maliciousness for each sample artifact in the sample set. In some implementations, the unified label associated with each artifact in the sample set can be used to generate a ground truth indication of classification of maliciousness for that artifact. The ground truth indications of artifacts in the sample set can then be used to evaluate performance of one or more sources of classification and/or data associate with the one or more sources of classification.

In some implementations, the sample set can be further narrowed based on telemetry information, as described herein. For example, the sample set can be further selected to generate a second sample set of artifacts for which there is telemetry information to obtain a matching or comparable set of artifacts based on which the results of performance of an identified source of classification can be evaluated. Said in another way, the second sample set of artifacts can be determined based on the artifacts that were used to test/evaluate the performance of an identified source of classification (e.g., an ML model). The identification of artifacts in the second sample set, with matching or comparable telemetry information as those used to test the identified source of classification, can be used as the basis for using ground truth indication of classification of maliciousness provided by the sample set of artifacts.

At 677, the method 600 includes displaying, via an interface, based on the ground truth indication of classification of maliciousness for one or more sample artifacts in the sample set, a representation of a performance of a source of classification. The representation can be any suitable representation of any suitable metric or measure of performance of the identified source of classification, as described herein.

Figure 7A:
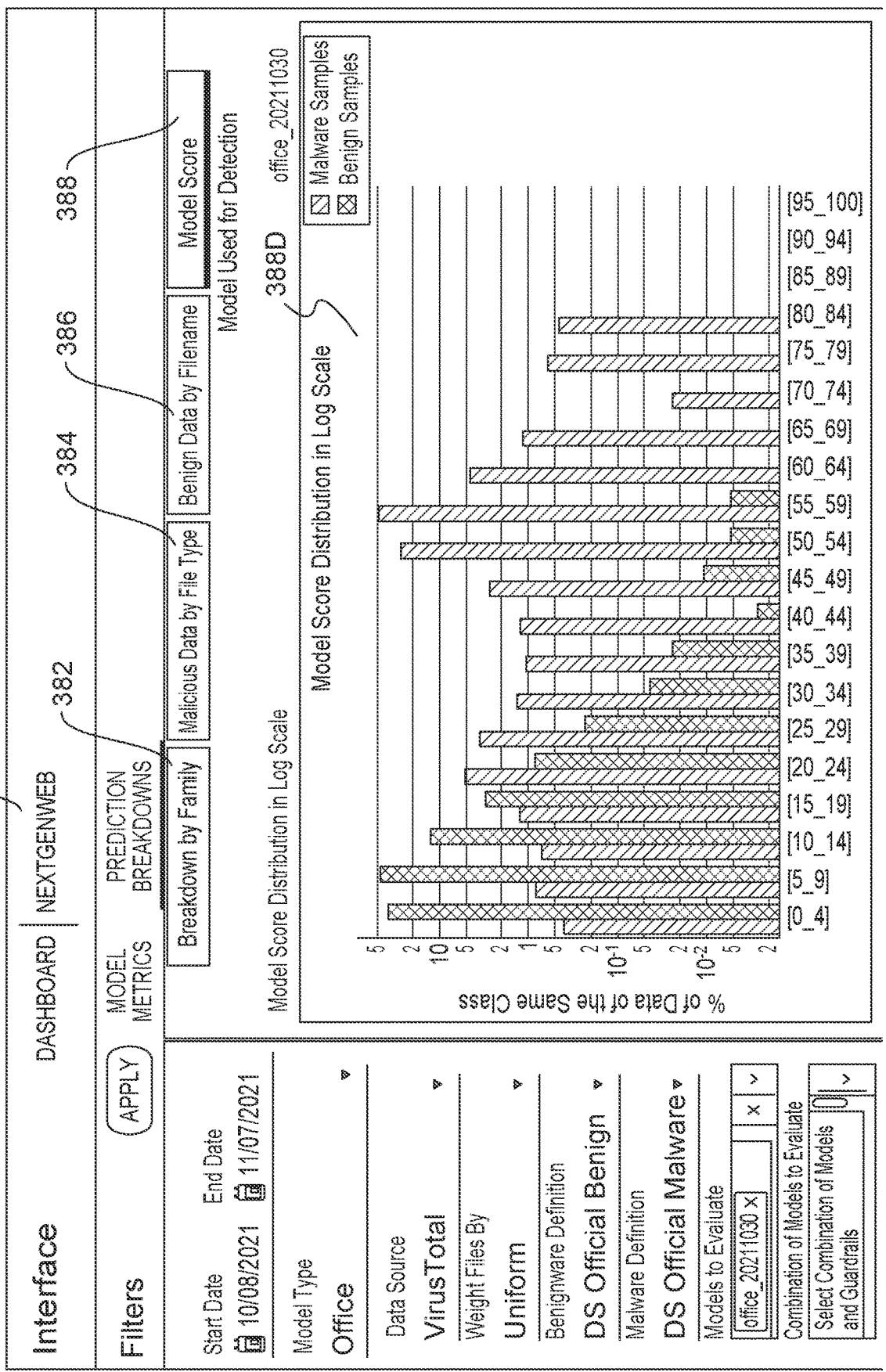

FIGS. 7A-7B is a schematic illustration of interface 350 in FIGS. 3A-3D, 4, 5, showing an example implementation displaying prediction breakdowns, according to an embodiment. As shown in FIGS. 7A-7B, the interface 350 can be used to display measures or metrics of performance (also referred to as "prediction of performance" herein), of one or more identified sources of classification (e.g., "office_20211030") broken down by any suitable property of the performance (also referred to as "prediction breakdowns" herein). Some example properties based on which the performance (or prediction) can be broken down, as shown in FIGS. 7A-7B, include breakdown by family of malware 382, breakdown based on filetypes of artifacts labeled malicious 384 (filetype-specific measures of performance), breakdown based on filenames of artifacts labeled benign 386 (filename-specific measures of performance), and breakdown of artifacts based on their scores and labels in the form of distributions 388 (label-specific measures of performance, the labels being "malicious" and "benign" assigned by the analysis device associated with the interface 350. As shown in the plot 388D, the artifacts labeled benign, indicated by the distribution including the bars with the cross hatching corresponding to "Benign Samples", show a predominant peak at the scores in the lower range of 0-25, while artifacts labeled malicious, indicated by the distribution including the bars with the cross hatching correspond-ing to "Malware Samples", show a predominant peak at the scores in the higher range of 25-80.

FIG. 8 is a schematic illustration of the interface 350 of FIGS. 3A-3D, 4, 5 and 7A-7B, showing an example representation 384D displaying prediction breakdowns indicating a performance of an identified source of classification (e.g., ML model) selected for review and evaluation, according to an embodiment. The prediction breakdowns are based on evaluation of the identified source of classification by comparing output (e.g., scores or likelihood indications of maliciousness) provided by the identified source of classification against the ground truth indication for an artifact or class of artifact. The prediction breakdowns can be breakdowns based on filetypes of artifacts labeled malicious 384. As shown in FIG. 8, the artifacts labeled as malicious can be grouped based on their filetype (e.g., file extension) and the interface 350 can display metrics of performance of an identified source of classification (e.g., "office_20211030") associated with each filetype. As an example, the display in FIG. 8 identifies filetype "Microsoft Excel-OLE" associated with a detection ratio of 0.40, filetype "Microsoft Excel-OPC" associated with a detection ratio of 0.34, filetype "OLE" associated with a detection ratio of 0.12, filetype "Microsoft Word-OPC" associated with a detection ratio of 0.10, filetype "Microsoft Word-OLE" associated with a detection ratio of 0.09, and so on. As shown, the detection ratio of each file type can be color coded (as indicated by a first cross hatching style in the "Detection Ratio" column) based on a predetermined scheme, for ease of visualization, to highlight higher scores (e.g., above a set threshold value) indicating better performance for that filetype with a first specified color (e.g., blue), as indicated by the first cross hatching style in the "Detection Ratio" column) and highlight lower scores (e.g., below a set threshold value) indicating worse performance for that filetype with a second specified color (as indicated by a second cross hatching style in the "Detection Ratio" column), and so one. The measures associated with the metrics (e.g., values of detection ratio) can also be mapped onto any suitable color scale such that larger numbers map to cooler colors (e.g., blue) while smaller numbers map to hotter colors (e.g., red).

In some implementations, as shown in FIGS. 9A-9B, which is a schematic illustration of the interface 350 of FIGS. 3A-3D, 4, 5,7A-7B, and 8, showing the example representation 384D, the interface 350 can include a sort tool 385 associated with a metric of performance (e.g., detection ratio). The sort tool 385 can be activated by a user to sort the filetypes listed based on the numerical values associated with the measure of the metric for each filetype. The sorting can be descending (indicated by the downward arrow) with larger values on top, as shown in the example in FIGS. 9A-9B, or it can be ascending with smaller values at the top. The display 384 of prediction breakdowns based on filetypes of artifacts labeled malicious shown in FIGS. 8 and 9, can also include other information or metrics of performance of the identified source of classification, associated with each filetype of artifacts, such as number of detected artifacts, number missed, total number of artifacts, number of unscanned artifacts, a ratio of unscanned artifacts, number of endpoints associated with each filetype of artifacts, etc.

Figure 10A:
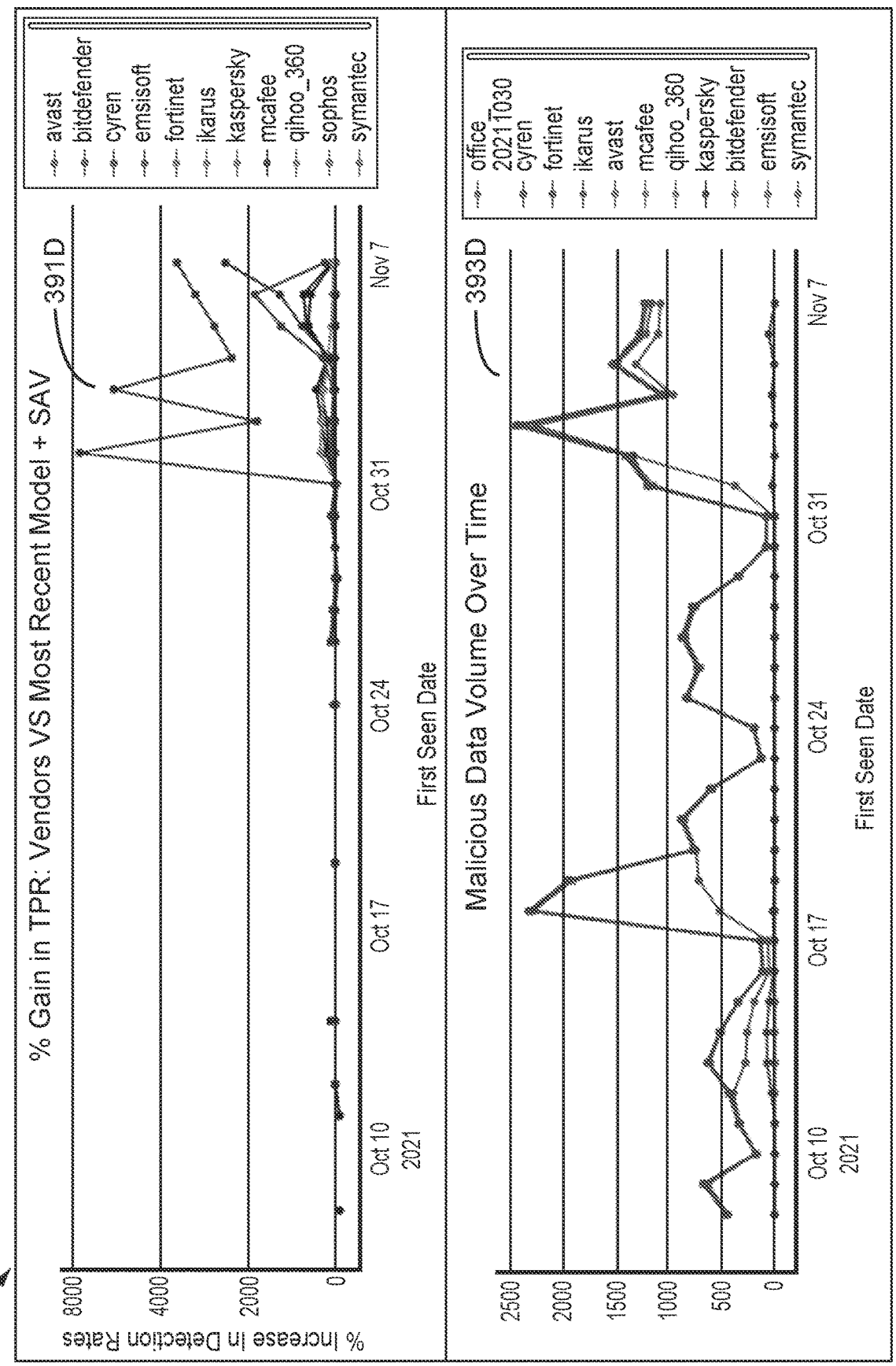
FIGS. 10A-10C. illustrate an interface showing an example visualization of performance of malware classification sources and data associated with the malware classification sources, according to an embodiment.
Figure 10B:
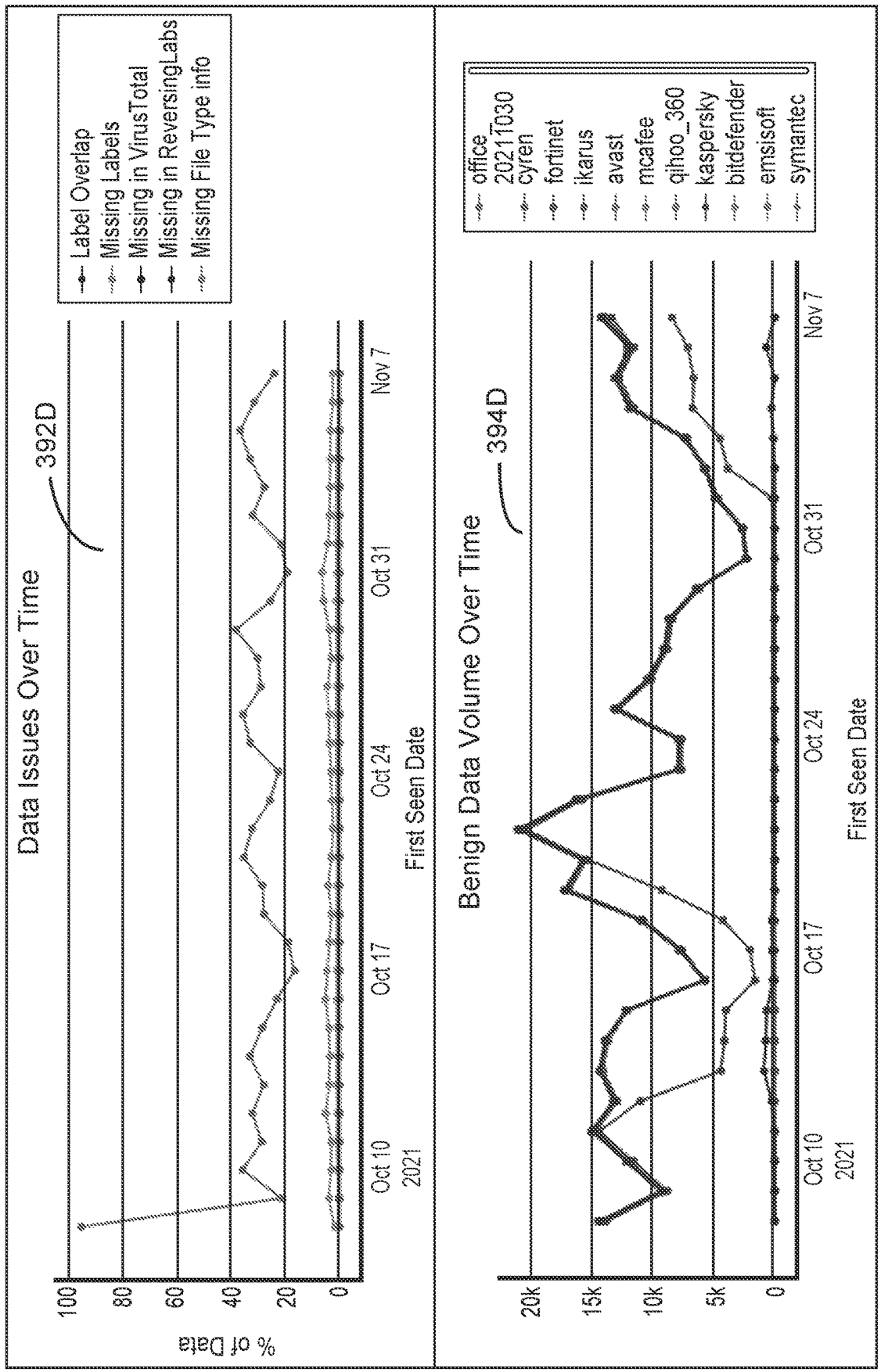
Figure 10C:
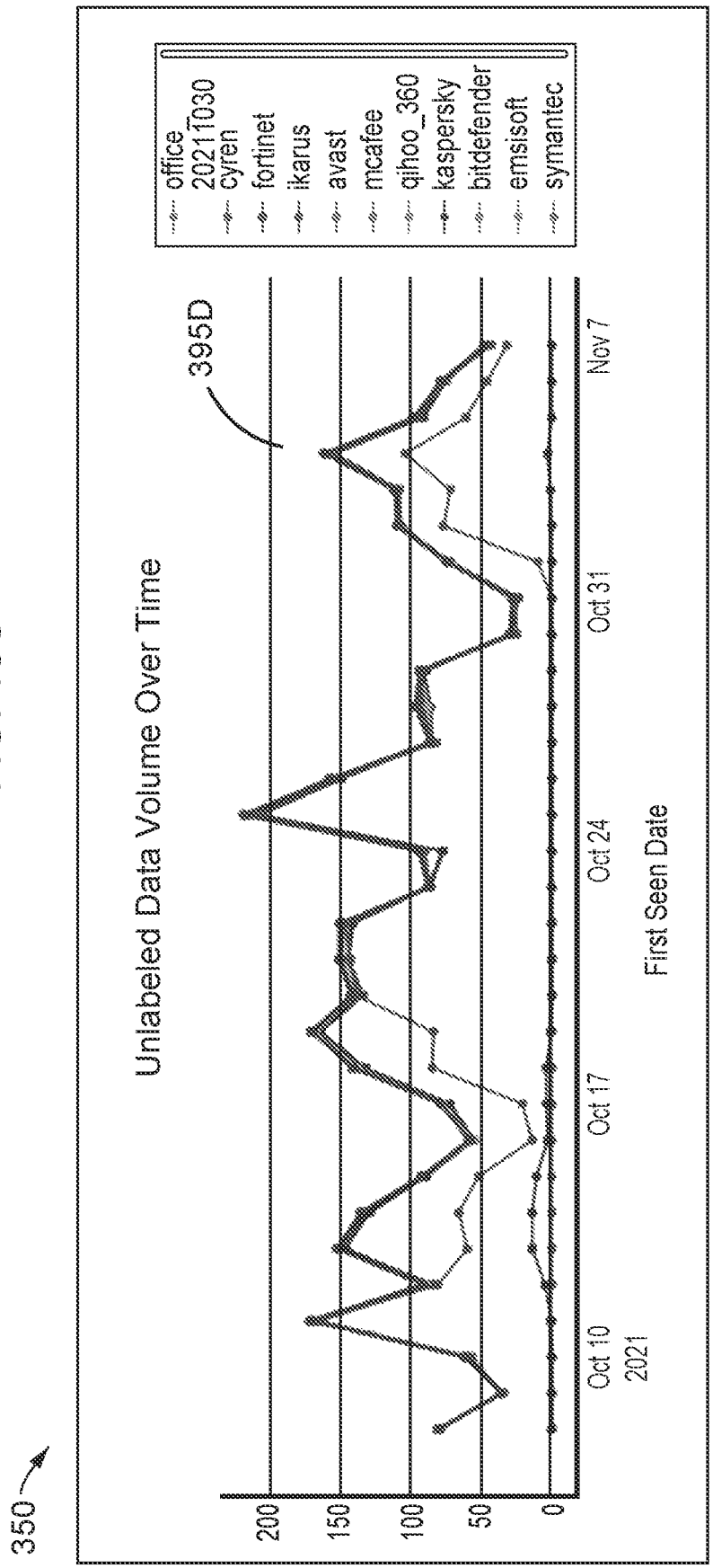

FIGS. 10A-10C is a schematic illustration of the interface 350 of FIGS. 3A-3D, 4, 5, 7A-7B, 8, and 9A-9B, showing an example representation displaying quality of data associated with one or more sources of classification, according to an embodiment. As shown in FIGS. 10A-10C, the interface 350 can include a plot 391D showing values of percentage change (e.g., increase) in True Positive Rate (TPR)

indicating a change (e.g., increase) in a proportion of true detections of malicious artifacts received from each source of classification (indexed by color, but not shown in FIG. 10 in color) as a function of time. The interface 350 can include a plot 392D showing percentage of artifacts having any identified issue (the issue being any suitable property of the artifact that can be predetermined) of the artifacts received from each source of classification (indexed by color, but not shown in FIG. 10 in color) as a function of time. The interface 350 can include a plot 393D showing a volume of artifacts identified as malicious (malicious data volume) of all the artifacts received from each source of classification (indexed by color, but not shown in FIG. 10 in color) as a function of time. The interface 350 can include a plot 394D showing a volume of artifacts identified as benign (benign data volume) of all the artifacts received from each source of classification (indexed by color, but not shown in FIG. 10 in color) as a function of time. The interface 350 can include a plot 395D showing a volume of artifacts identified as unlabeled of all the artifacts received from each source of classification (indexed by color, but not shown in FIG. 10 in color) as a function of time.

Figure 11:
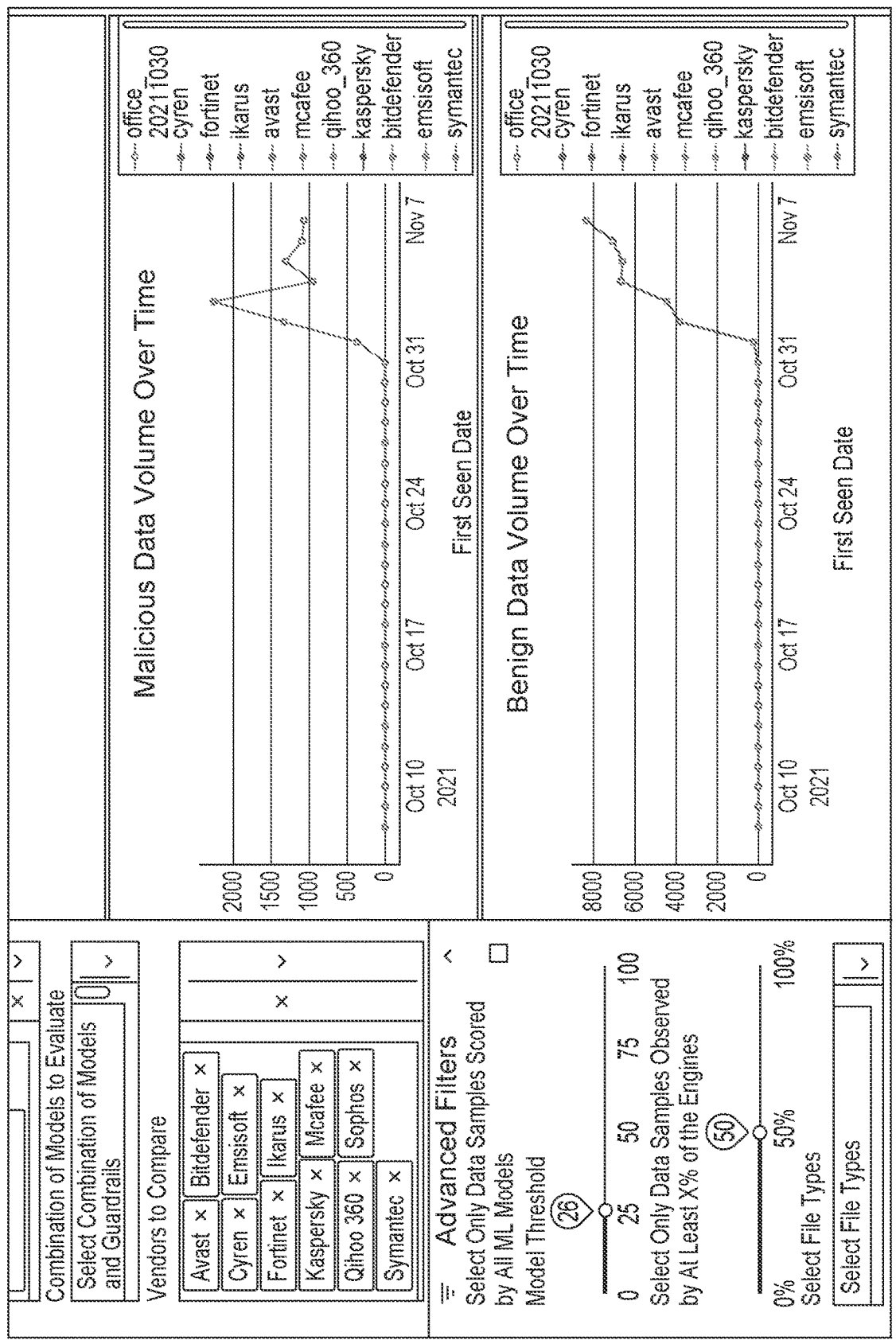
FIG. 11 illustrates an interface showing an example visualization of data associated with malware classification sources, according to an embodiment.

FIG. 11 is a schematic illustration of the interface 350 of FIGS. 3A-3D, 4, 5, 7A-7B, 8, 9A-9B, and 10A-10C, showing an example representation displaying additional plots used to monitor quality of data associated with one or more sources of classification, according to an embodiment. The plots of FIG. 11 show a volume of artifacts identified as malicious in the top plot, and a volume of artifacts identified as benign in the bottom plot, respectively, of the artifacts received from an identified source of classification (selection highlighted in the index of sources associated with colors, but not shown in FIG. 10 in color) as a function of time.

The example data representations in FIGS. 10A-10C and 11 can be used to monitor and track data quality and make decisions of using any particular data from one or more sources. For example, an identified peak in a plot can be used as a trigger to make recommendations to further review the data or make decisions to filter out the data due to an indication of lower than desired quality. The recommendations can be via a user or done automatically by communicating with a security system.

While various embodiments have been described above, it should be understood that they have been presented by way of example only, and not limitation. Where methods and/or schematics described above indicate certain events and/or flow patterns occurring in certain order, the ordering of certain events and/or flow patterns can be modified. While the embodiments have been particularly shown and described, it will be understood that various changes in form and details can be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments, and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
one or more memories; and
one or more processors in communication with the one or more memories, wherein the one or more processors is configured to:
receive, via an interface, data associated with a plurality of sources of classification of maliciousness, the data including information associated with a plurality of artifacts, each artifact from the plurality of artifacts being associated with at least one score indicating a classification of maliciousness of that artifact based on at least one source of classification from the plurality of sources of classification of maliciousness;

receive a selection, via the interface, of a subset of sources of classification of maliciousness from the plurality of sources of classification of maliciousness, the subset of sources of classification used to define a data set that is drawn from the data associated with the plurality of sources of classification of maliciousness, the data set including information associated with a set of artifacts from the plurality of artifacts such that each artifact from the set of artifacts has at least one score indicating a classification of maliciousness based on at least one source of classification from the subset of sources of classification of maliciousness;

determine a label indicating a classification of maliciousness for each artifact from the set of artifacts based on indications of maliciousness for that artifact from a predefined number of sources of classification from the subset of sources of classification;

identify comparisons between the label for each artifact from the set of artifacts and the at least one score indicating a classification of maliciousness for that artifact based on at least one evaluated source of classification of maliciousness from the plurality of sources of classification of maliciousness;

determine, based on the comparisons, a set of aggregate measures of performance of the at least one evaluated source of classification of maliciousness;

receive, via the interface, a request for information associated with a performance of the at least one evaluated source of classification of maliciousness; and display, via the interface, a graphical representation of at least one aggregate measure from the set of aggregate measures of performance of the at least one evaluated source of classification of maliciousness.

2. The apparatus of claim 1, wherein the at least one evaluated source of classification of maliciousness is a Machine Learning (ML) model trained to classify potentially malicious artifacts, and the one or more processors is further configured to:

automatically retrain the ML model based on the set of aggregate measures of performance.

3. The apparatus of claim 1, wherein the data is first data, and the one or more processors is further configured to:

receive second data associated with a potentially malicious artifact; and automatically use the at least one evaluated source of classification of maliciousness to determine a maliciousness of the potentially malicious artifact based on the second data and the set of aggregate measures of performance of the at least one evaluated source of classification.

4. The apparatus of claim 1, wherein the set of artifacts is a set of files, and the set of aggregate measures of performance is a first set of aggregate measures of performance, the one or more processors further configured to:

group the set of files in the data set based on a file extension associated with each file from set of files;

determine, based on the comparisons, a second set of aggregate measures of performance of the at least one evaluated source of classification, an aggregate measure of performance from the second set of aggregate measures of performance being associated with each type of file extension from one or more file extensions associated with the set of files from the data set;

receive, via the interface, a request for information associated with a performance of the at least one source of classification from the subset of sources of classification for at least one type of file extension; and display, via the interface, a graphical representation of at least one aggregate measure of performance associated with the at least one type of file extension and from the second set of aggregate measures of performance of the at least one evaluated source of classification of maliciousness.

5. The apparatus of claim 1, wherein the one or more processors is further configured to:

receive, via the interface, a first criterion for labeling sample artifacts from the data set, the first criterion indicating a threshold score associated with a classification of maliciousness of a sample artifact;

receive, via the interface, a second criterion for selecting sample artifacts from the data set, the second criterion indicating a minimum number of scores associated with a sample artifact, each score from the minimum number of scores being associated with a classification of maliciousness of that sample artifact based on a source of classification from the subset of sources of classification;

select, based on the first criterion and the second criterion, sample artifacts from the data set to define a sample set; and determine, based on analysis of one or more statistics associated with labels of each sample artifact in the data set, a ground truth indication of classification of maliciousness for each sample artifact in the sample set.

6. The apparatus of claim 1, wherein the one or more processors is further configured to:

receive, via the interface, new information associated with an artifact from the set of artifacts; and update, based on the new information, a ground truth indication of the classification of maliciousness of that artifact.

7. The apparatus of claim 1, wherein the data is first data, and the plurality of artifacts is a first plurality of artifacts, the one or more processors further configured to:

receive second data associated with an identified source of classification, the identified source of classification being an identified ML model, the second data including information associated with a second plurality of artifacts, each artifact from the second plurality of artifacts having a score associated with a classification of maliciousness of that artifact based on an output from the identified ML model;

receive telemetry information associated with the first data and the second data;

identify a subset of artifacts from the set of artifacts, such that each artifact from the subset of artifacts is matched, based on the telemetry information, with a corresponding artifact from the second plurality of artifacts;

generate a ground truth indication of the classification of maliciousness of each artifact from the subset of artifacts based on the label indicating a classification of maliciousness for each artifact from the subset of artifacts;

compare the ground truth indication of the classification of maliciousness of each artifact from the subset of artifacts and the at least one score related to a classification of maliciousness based on an output from the identified ML model; and determine, based on the comparisons, measures of performance of the identified ML model, the measures of performance being based on the second plurality of artifacts for which there is a matched corresponding artifact from the subset of artifacts.

8. A method, comprising:
receiving information associated with a plurality of artifacts, each artifact from the plurality of artifacts being associated with at least one score associated with a classification of maliciousness of that artifact based on a source of classification from a plurality of sources of classification;
receiving a first criterion for classifying each artifact from the plurality of artifacts, the first criterion indicating a threshold score associated with a classification of maliciousness of that artifact;
receiving a second criterion for selecting sample artifacts from the plurality of artifacts, the second criterion indicating a minimum number of scores associated with a sample artifact, each score from the minimum number of scores being associated with a classification of maliciousness of that sample artifact based on a source of classification from the plurality of sources of classification;
classifying the plurality of artifacts based on the first criterion;
selecting, based on the second criterion, sample artifacts from the plurality of artifacts to define a sample set;
determining, based on the selecting, a ground truth indication of classification of maliciousness for each sample artifact in the sample set; and
displaying, via an interface, based on the ground truth indication of classification of maliciousness for one or more sample artifacts in the sample set, a representation of a performance of a source of classification from the plurality of sources of classification.

9. The method of claim 8, further comprising:
comparing the ground truth indication of classification for each sample artifact in the sample set with a classification of maliciousness of that sample artifact based on an output from an identified source of classification; and
automatically retraining the identified source of classification based on the comparing.

10. The method of claim 8, further comprising:
receiving information associated with a potentially malicious artifact, the potentially malicious artifact being associated with the one or more sample artifacts in the sample set; and
automatically performing an action based on the ground truth indication of classification of maliciousness for the sample artifacts in the sample set, the action including at least one of blocking a communication with an entity associated with the potentially malicious artifact, quarantining one or more files associated with the potentially malicious artifact, or sending, to a compute device, a report indicating the maliciousness of the potentially malicious artifact.

11. The method of claim 8, further comprising:
receiving a request to evaluate one or more sources of classification from the plurality of sources of classification;
selecting a subset of artifacts from the plurality of artifacts such that each artifact from the subset of artifacts is associated with at least one score associated with a classification of maliciousness of that artifact based on an output of at least one source of classification from the one or more sources of classification;
comparing the ground truth indication of the classification of maliciousness of each artifact from the subset of artifacts and the at least one score associated with a classification of maliciousness of that artifact based on an output of at least one source of classification from the one or more sources of classification; and
determining one or more measures of performance associated with each source of classification from the one or more sources of classification.

12. The method of claim 11, wherein the one or more measures of performance associated with each source of classification from the one or more sources of classification includes at least one of detection rate, false positive rate, ratio of samples identified as malicious, ratio of samples identified as benign, detection rate as a function of time, false positive rate as a function of time, or receiver operating curves (ROC) associated with performance of an ML model.

13. The method of claim 11, wherein the subset of artifacts is a subset of files, the method further comprising:
grouping each file from the subset of files based on a file extension associated with each file from the subset of files;
determining, based on the comparing, filetype-specific measures of performance of the one or more sources of classification, each filetype-specific measure of performance being associated with at least one type of file extension from one or more file extensions associated with the files from the subset of files; and
displaying a graphical representation of at least one filetype-specific measure of performance associated with the at least one type of file extension and for at least one source of classification from the one or more sources of classification.

14. The method of claim 11, wherein the one or more measures of performance associated with a source of classification from the one or more sources of classification includes a distribution of scores associated with classification of maliciousness of the subset of artifacts based on an output of the source of classification from the one or more sources of classification.

15. The method of claim 11, wherein the one or more measures of performance associated with a source of classification from the one or more sources of classification includes a first distribution of scores associated with a classification of maliciousness of the subset of artifacts as malicious based on an output of the source of classification and a second distribution of scores associated with a classification of maliciousness of the subset of artifacts as benign based on an output of the source of classification from the one or more sources of classification, the method further comprising:
displaying a graphical representation of the first distribution of scores and the second distribution of scores, the first distribution and the second distribution being plotted on a logarithmic scale.

16. One or more non-transitory processor readable media storing code representing instructions to be executed by one or more processors, the instructions comprising code to cause the one or more processors to:
receive first data associated with a plurality of machine learning (ML) models, each ML model from the plurality of ML models being associated with curated data on potentially malicious content, the first data being associated with a first plurality of files, each file from the first plurality of files associated with at least one score of a classification of maliciousness of that file based on an output from at least one ML model from the plurality of ML models;
receive second data associated with an identified ML model, the second data being associated with a second plurality of files, each file from the second plurality of files associated with a score of a classification of maliciousness of that file based on an output from the identified ML model;

receive telemetry information associated with the first data and the second data;

identify a subset of files from the first plurality of files such that each file from the subset of files is matched, based on the telemetry information, with a corresponding file from the second plurality of files;

define ground truth information associated with a classification of maliciousness for each file from the subset of files, the ground truth information being based on the at least one score of a classification of maliciousness of each file from the subset of files based on an output from at least one ML model from the plurality of ML models;

assign, based on the ground truth information, a label to a set of files from the second plurality of files, each file from the set of files being matched with a corresponding file from the subset of files; and display a graphical representation of labels associated with the set of files from the second plurality of files.

17. The one or more non-transitory processor readable media of claim 16, further comprising code to cause the one or more processors to:

receive new information associated with a file from the second plurality of files that was assigned a label; and update the label based on the new information.

18. The one or more non-transitory processor readable media of claim 16, further comprising code to cause the one or more processors to:

receive a first criterion for selecting files from the subset of files, the first criterion indicating a threshold score associated with a classification of maliciousness of a file;

receive a second criterion for selecting files from the subset of files, the second criterion indicating a minimum number of scores associated with a file, each score from the minimum number of scores being associated with a classification of maliciousness of that file from an output from at least one ML model from the plurality of ML models; and select, based on the first criterion and the second criterion, files from the subset of files to define the ground truth information.

19. The one or more non-transitory processor readable media of claim 16, further comprising code to cause the one or more processors to:

determine, based on the label assigned to each file from the set of files, a set of aggregate measures of performance of the identified ML model.

20. The one or more non-transitory processor readable media of claim 19, further comprising code to cause the one or more processors to:

group the set of files based on a file extension associated with each file from the set of files such that an aggregate measure of performance from the set of aggregate measures of performance is associated with each type of file extension from one or more file extensions associated with the second plurality of files.

21. The one or more non-transitory processor readable media of claim 16, wherein the identified ML model is not included in the plurality of ML models.

* * * * *

UNITED STATES PATENT AND TRADEMARK OFFICE
CERTIFICATE OF CORRECTION

PATENT NO. : 12,166,790 B2
APPLICATION NO. : 17/710027
DATED : December 10, 2024
INVENTOR(S) : Konstantin Berlin et al.

Page 1 of 1

It is certified that error appears in the above-identified patent and that said Letters Patent is hereby corrected as shown below:

In the Specification

Column 10, Line 11, delete "process configured to train an MIL model (not shown in FIG." and insert -- process configured to train an ML model (not shown in FIG. --

Column 27, Line 33, delete "but not shown in FIG. 10 in color) as a function of time." and insert -- but not shown in FIG. 11 in color) as a function of time. --

In the Claims

Column 29, Line 56 (Claim 4, Line 6), delete "extension associated with each file from set of files" and insert -- extension associated with each file from the set of files --

Signed and Sealed this
Fourth Day of February, 2025

Coke Morgan Stewart
*Acting Director of the United States Patent and Trademark Office*